(12) United States Patent
Liu et al.

(10) Patent No.: US 8,894,891 B2
(45) Date of Patent: Nov. 25, 2014

(54) COPOLYMER-ASSOCIATED NANOMATERIAL

(75) Inventors: Wenhao Liu, Cambridge, MA (US); Peter Matthew Allen, Cambridge, MA (US); Numpon Insin, Cambridge, MA (US); Moungi G. Bawendi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 723 days.

(21) Appl. No.: 12/857,430

(22) Filed: Aug. 16, 2010

(65) Prior Publication Data
US 2011/0037029 A1 Feb. 17, 2011

Related U.S. Application Data

(60) Provisional application No. 61/234,305, filed on Aug. 16, 2009.

(51) Int. Cl.
| | | |
|---|---|---|
| *H01B 1/24* | (2006.01) | |
| *C08G 65/333* | (2006.01) | |
| *B82Y 40/00* | (2011.01) | |
| *B82Y 30/00* | (2011.01) | |
| *C08L 71/02* | (2006.01) | |
| *C08G 65/332* | (2006.01) | |
| *C08F 220/54* | (2006.01) | |

(52) U.S. Cl.
CPC ........... *B82Y 40/00* (2013.01); *C08G 65/33306* (2013.01); *B82Y 30/00* (2013.01); *C80L 2205/05* (2013.01); *C08L 71/02* (2013.01); *C08G 65/3322* (2013.01); *C08F 220/54* (2013.01)
USPC .................. 252/519.33; 252/519.34; 252/500; 528/395

(58) Field of Classification Search
USPC .................. 252/519.33, 519.34, 500; 528/392
See application file for complete search history.

(56) References Cited

U.S. PATENT DOCUMENTS

| | | | |
|---|---|---|---|
| 6,225,198 B1 | 5/2001 | Alivisatos et al. | |
| 6,306,736 B1 | 10/2001 | Alivisatos et al. | |
| 6,322,901 B1 * | 11/2001 | Bawendi et al. | 428/548 |
| 6,576,291 B2 | 6/2003 | Bawendi et al. | |
| 6,855,202 B2 | 2/2005 | Alivisatos et al. | |
| 7,205,048 B2 * | 4/2007 | Naasani | 428/403 |
| 2004/0091710 A1 * | 5/2004 | Bawendi et al. | 428/407 |
| 2004/0106781 A1 * | 6/2004 | Emrick et al. | 530/400 |
| 2005/0112376 A1 * | 5/2005 | Naasani | 428/403 |
| 2006/0088713 A1 * | 4/2006 | Dykstra et al. | 428/402 |
| 2007/0152236 A1 * | 7/2007 | Halpert et al. | 257/183 |
| 2008/0305968 A1 | 12/2008 | Nakamura et al. | |
| 2011/0236315 A1 * | 9/2011 | Han et al. | 424/9.1 |

FOREIGN PATENT DOCUMENTS

WO    WO 2009/002837    12/2008

OTHER PUBLICATIONS

Peter M. Allen et al., "InAs(ZnCdS) Quantum Dots Optimized for Biological Imaging in the Near-Infrared", J. Am. Chem. Soc., 2010, 132, 470-471.*
Wenhao Liu et al., "Compact Biocompatible Quantum Dots via Raft-Mediated Synthesis of Imidazole-Based Random Copolymer Ligand", J. Am. Chem. Soc., 2010, 132, 472-483.*
Aaron R. Clapp, I. L. M., Hedi Mattoussi Förster Resonance Energy Transfer Investigations Using Quantum-Dot Fluorophores. ChemPhysChem 2006, 7, (1), 47-57.
Aldana, J.; Wang, Y. A.; Peng, X., Photochemical Instability of CdSe Nanocrystals Coated by Hydrophilic Thiols. J. Am. Chem. Soc. 2001, 123, (36), 8844-8850.
Algar, W. R.; Krull, U. J., Adsorption and Hybridization of Oligonucleotides on Mercaptoacetic Acid-Capped CdSe/ZnS Quantum Dots and Quantum Dot-Oligonucleotide Conjugates. Langmuir 2006, 22, (26), 11346-11352.
Aoyagi, N.; et al., Mild and Efficient One-Step Synthesis of Trithiocarbonates Using Minimum Amount of CS2. ChemInform 2006, 37, (27).
Ballou, B.; Lagerholm, B. C.; Ernst, L. A.; Bruchez, M. P.; Waggoner, A. S., Noninvasive Imaging of Quantum Dots in Mice. Bioconjug. Chem. 2004, 15, (1), 79-86.
Bentzen, E. L.; Tomlinson, I. D.; Mason, J.; Gresch, P.; Warnement, M. R.; Wright, D.; Sanders-Bush, E.; Blakely, R.; Rosenthal, S. J., Surface modification to reduce nonspecific binding of quantum dots in live cell assays. Bioconjugate Chemistry 2005, 16, (6), 1488-1494.
Bruchez, M., Jr.; Moronne, M.; Gin, P.; Weiss, S.; Alivisatos, A. P., Semiconductor Nanocrystals as Fluorescent Biological Labels. Science 1998, 281, (5385), 2013-2016.
Chiefari, J.; Chong, Y. K.; Ercole, F.; Krstina, J.; Jeffery, J.; Le, T. P. T.; Mayadunne, R. T. A.; Meijs, G. F.; Moad, C. L.; Moad, G.; Rizzardo, E.; Thang, S. H., Living free-radical polymerization by reversible addition-fragmentation chain transfer: The RAFT process. Macromolecules 1998, 31, (16), 5559-5562.
Dabbousi, B. O.; Rodriguez-Viejo, J.; Mikulec, F. V.; Heine, J. R.; Mattoussi, H.; Ober, R.; Jensen, K. F.; Bawendi, M. G., (CdSe)ZnS Core-Shell Quantum Dots: Synthesis and Characterization of a Size Series of Highly Luminescent Nanocrystallites. J. Phys. Chem. B 1997, 101, (46), 9463-9475.
Dahan, M.; Levi, S.; Luccardini, C.; Rostaing, P.; Riveau, B.; Triller, A., Diffusion Dynamics of Glycine Receptors Revealed by Single-Quantum Dot Tracking. Science 2003, 302, (5644), 442-445.
Eaton, D., Reference Materials for Fluorescence Measurement. Pure Appl. Chem. 1988, 60, (7), 1107-1114.

(Continued)

*Primary Examiner* — Douglas Mc Ginty
(74) *Attorney, Agent, or Firm* — Steptoe & Johnson LLP

(57) ABSTRACT

A nanomaterial can include an outer layer including a ligand. The ligand can include a first monomer unit including a first moiety having affinity for a surface of the nanocrystal, a second monomer unit including a second moiety having a high water solubility, and a third monomer unit including a third moiety having a selectively reactive functional group or a selectively binding functional group. The ligand can be a random copolymer.

9 Claims, 13 Drawing Sheets

(56) References Cited

OTHER PUBLICATIONS

Groc, L.; Heine, M.; Cognet, L.; Brickley, K.; Stephenson, F. A.; Lounis, B.; Choquet, D., Differential activity-dependent regulation of the lateral mobilities of AMPA and NMDA receptors. Nat. Neurosci. 2004, 7, (7), 695-696.

Howarth, M.; Chinnapen, D. J. F.; Gerrow, K.; Dorrestein, P. C.; Grandy, M. R.; Kelleher, N. L.; El-Husseini, A.; Ting, A. Y., Monovalent streptavidin with a single femtomolar biotin binding site. Nat Meth 2006, 3, (4), 267-273.

Howarth, M.; Liu, W.; Puthenveetil, S.; Zheng, Y.; Marshall, L. F.; Schmidt, M. M.; Wittrup, K. D.; Bawendi, M. G.; Ting, A. Y., Monovalent, reduced-size quantum dots for imaging receptors on living cells. Nat Meth 2008, 5, (5), 397-399.

Howarth, M.; Takao, K.; Hayashi, Y.; Ting, A. Y., Targeting quantum dots to surface proteins in living cells with biotin ligase. Proc Natl Acad Sci USA. 2005, 102, (21), 7583-7588.

Iyer, G.; Michalet, X.; Chang, Y. P.; Pinaud, F. F.; Matyas, S. E.; Payne, G.; Weiss, S., High Affinity scFv-Hapten Pair as a Tool for Quantum Dot Labeling and Tracking of Single Proteins in Live Cells. Nano Letters 2008, 8, (12), 4618-4623.

Li, J. J.; Wang, Y. A.; Guo, W. Z.; Keay, J. C.; Mishima, T. D.; Johnson, M. B.; Peng, X. G., Large-scale synthesis of nearly monodisperse CdSe/CdS core/shell nanocrystals using air-stable reagents via successive ion layer adsorption and reaction. Journal of the American Chemical Society 2003, 125, (41), 12567-12575.

Liu, W.; Howarth, M.; Greytak, A. B.; Zheng, Y.; Nocera, D. G.; Ting, A. Y.; Bawendi, M. G., Compact Biocompatible Quantum Dots Functionalized for Cellular Imaging. J. Am. Chem. Soc. 2008, 130, (4), 1274-1284.

Mattoussi, H.; Mauro, J. M.; Goldman, E. R.; Anderson, G. P.; Sundar, V. C.; Mikulec, F. V.; Bawendi, M. G., Self-Assembly of CdSe-ZnS Quantum Dot Bioconjugates Using an Engineered Recombinant Protein. J. Am. Chem. Soc. 2000, 122, (49), 12142-12150.

Medintz, I. L.; Clapp, A. R.; Mattoussi, H.; Goldman, E. R.; Fisher, B.; Mauro, J. M., Self-assembled nanoscale biosensors based on quantum dot FRET donors. Nat. Mater. 2003, 2, (9), 630-638.

Medintz, I. L.; Pons, T.; Delehanty, J. B.; Susumu, K.; Brunel, F. M.; Dawson, P. E.; Mattoussi, H., Intracellular delivery of quantum dot-protein cargos mediated by cell penetrating peptides. Bioconjugate Chemistry 2008, 19, (9), 1785-1795.

Mei, B. C.; Susumu, K.; Medintz, I. L.; Delehanty, J. B.; Mountziaris, T. J.; Mattoussi, H., Modular poly(ethylene glycol) ligands for biocompatible semiconductor and gold nanocrystals with extended pH and ionic stability. Journal of Materials Chemistry 2008, 18, (41), 4949-4958.

Michalet, X.; Pinaud, F. F.; Bentolila, L. A.; Tsay, J. M.; Doose, S.; Li, J. J.; Sundaresan, G.; Wu, A. M.; Gambhir, S. S.; Weiss, S., Quantum Dots for Live Cells, in Vivo Imaging, and Diagnostics. Science 2005, 307, (5709), 538-544.

Michaluk, P.; Mikasova, L.; Groc, L.; Frischknecht, R.; Choquet, D.; Kaczmarek, L., Matrix Metalloproteinase-9 Controls NMDA Receptor Surface Diffusion through Integrin beta 1 Signaling. Journal of Neuroscience 2009, 29, (18), 6007-6012.

Motoike, T.; Loughna, S.; Perens, E.; Roman, B.; Liao, W.; Chau, T.; Richardson, C.; Kawate, T.; Kuno, J.; Weinstein, B.; Stainier, D.; Sato, T., Universal GFP Reporter for the Study of Vascular Development. Genesis 2000, 28, 75-81.

Murray, C. B.; Norris, D. J.; Bawendi, M. G., Synthesis and characterization of nearly monodisperse CdE (E = sulfur, selenium, tellurium) semiconductor nanocrystallites. J. Am. Chem. Soc. 1993, 115, (19), 8706-8715.

Peng, Z. A.; Peng, X., Formation of High-Quality CdTe, CdSe, and CdS Nanocrystals Using CdO as Precursor. J. Am. Chem. Soc. 2001, 123, (1), 183-184.

Sapsford, K. E.; Pons, T.; Medintz, I. L.; Higashiya, S.; Brunel, F. M.; Dawson, P. E.; Mattoussi, H., Kinetics of Metal-Affinity Driven Self-Assembly between Proteins or Peptides and CdSe-ZnS Quantum Dots. J. Phys. Chem. C. 2007, 111, (11528-11538).

Smith, A. M.; Duan, H.; Rhyner, M. N.; Ruan, G.; Nie, S., A systematic examination of surface coatings on the optical and chemical properties of semiconductor quantum dots. Phys. Chem. Chem. Phys. 2006, 8, 3895-3903.

Snee, P. T.; Chan, Y.; Nocera, D. G.; Bawendi, M. G., Whispering-Gallery-Mode Lasing from a Semiconductor Nanocrystal/Microsphere Resonator Composite. Adv. Mater. 2005, 17, (9), 1131-1136.

Snee, P. T.; Somers, R. C.; Nair, G.; Zimmer, J. P.; Bawendi, M. G.; Nocera, D. G., A Ratiometric CdSe/ZnS Nanocrystal pH Sensor. J. Am. Chem. Soc. 2006, 128, (41), 13320-13321.

Somers, R. C.; Bawendi, M. G.; Nocera, D. G., CdSe nanocrystal based chem-/bio- sensors. Chem. Soc. Rev. 2007, 36, 579-591.

Susumu, K.; Uyeda, H. T.; Medintz, I. L.; Pons, T.; Delehanty, J. B.; Mattoussi, H., Enhancing the stability and biological functionalities of quantum dots via compact multifunctional ligands. Journal of the American Chemical Society 2007, 129, (45), 13987-13996.

Ueda, E. K. M.; Gout, P. W.; Morganti, L., Current and prospective applications of metal ion-protein binding. Journal of Chromatography A 2003, 988, (1), 1-23.

Uyeda, H. T.; Medintz, I. L.; Jaiswal, J. K.; Simon, S. M.; Mattoussi, H., Synthesis of Compact Multidentate Ligands to Prepare Stable Hydrophilic Quantum Dot Fluorophores. J. Am. Chem. Soc. 2005, 127, (11), 3870-3878.

Wu, X.; Liu, H.; Liu, J.; Haley, K. N.; Treadway, J. A.; Larson, J. P.; Ge, N.; Peale, F.; Bruchez, M. P., Immunofluorescent labeling of cancer marker Her2 and other cellular targets with semiconductor quantum dots. Nature Biotechnol. 2003, 21, (1), 41-46.

Xie, R.; Kolb, U.; Li, J.; Basche, T.; Mews, A., Synthesis and Characterization of Highly Luminescent CdSe-Core CdS/Zn0.5Cd0.5S/ZnS Multishell Nanocrystals. J. Am. Chem. Soc. 2005, 127, (20), 7480-7488.

Yildiz, I.; McCaughan, B.; Cruickshank, S. F.; Callan, J. F.; Raymo, F. i. M., Biocompatible CdSe-ZnS Core-Shell Quantum Dots Coated with Hydrophilic Polythiols. Langmuir 2009, 25, (12), 7090-7096.

Zimmer, J. P.; Kim, S.-W.; Ohnishi, S.; Tanaka, E.; Frangioni, J. V.; Bawendi, M. G., Size Series of Small Indium Arsenide-Zinc Selenide Core-Shell Nanocrystals and Their Application to In Vivo Imaging. J. Am. Chem. Soc. 2006, 128, (8), 2526-2527.

Li, Y. et al, "Interactions between Sodium Dodecyl Sulfate and Six Nonionic Copolymers Containing 10 Mol % of Different Covalently Bonded Derivatives of Vinyl Acrylic Acid: Electromotive Force and Microcalorimetry Studies," LANGMUIR, vol. 19, No. 6, Feb 6, 2003. pp. 2026-2033.

International Preliminary Report on Patentability mailed Mar. 1, 2012 for PCT/US2010/045640.

International Search Report and Written Opinion mailed Dec. 30, 2010 for PCT/US2010/045640.

* cited by examiner

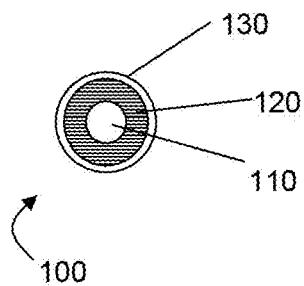
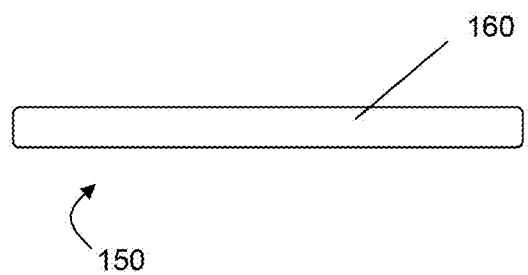
FIG. 1A  FIG. 1B
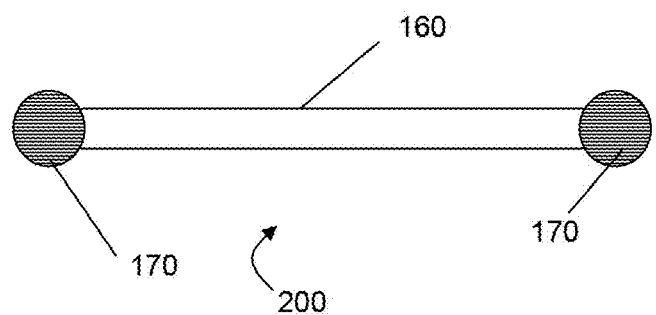
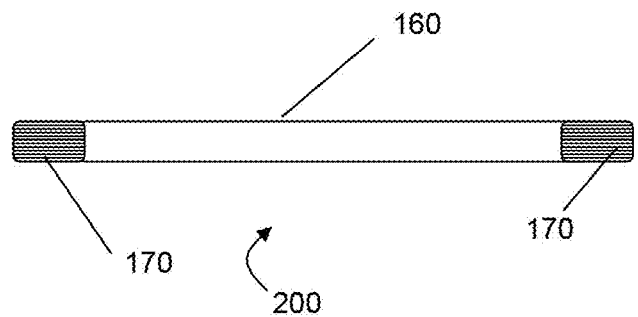
FIG. 1C

COPOLYMER-ASSOCIATED NANOMATERIAL

CLAIM OF PRIORITY

This application claims priority to provisional U.S. Patent Application Ser. No. 61/234,305, filed on Aug. 16, 2009, which is incorporated by reference in its entirety.

FEDERALLY SPONSORED RESEARCH OR DEVELOPMENT

This invention was made with government support under Grant No. DMR0819762 awarded by the National Science Foundation and under Grant Nos. CA126642 and CA119349 awarded by the National Institutes of Health and under Contract No. W911NF-07-D-0004 awarded by the Army Research Office. The government has certain rights in this invention.

TECHNICAL FIELD

The invention relates to copolymer-associated nanocrystals.

BACKGROUND

Nanocrystals having small dimensions can have properties intermediate between molecular and bulk forms of matter. For example, nanocrystals of semiconductor materials having sufficiently small dimensions can exhibit quantum confinement of excitons (excited state electron-hole pair) in all three dimensions. Quantum confinement leads to an increase in the effective band gap of the material with decreasing crystallite size. Consequently, both the optical absorption and emission of nanocrystals shift to the blue (i.e., to higher energies) as the size of the nanocrystal decreases.

The quantum efficiency of emission from nanocrystals having a core of a first semiconductor material can be enhanced by applying an overcoating of a second semiconductor material such that the conduction band of the second semiconductor material is of higher energy than that of the first semiconductor material, and the valence band of the second semiconductor material is of lower energy than that of the first semiconductor material. As a result, both charge carriers of an exciton, i.e., electrons and holes, are confined in the core of the nanocrystal.

SUMMARY

Nanocrystals can be highly luminescent, monodisperse, photostable, and with appropriate surface derivitization water-soluble and biocompatible. Nanocrystal ligands can be copolymers, where the different monomer components are each selected to confer a desired property to the derivitazed nanocrystals. The resulting nanocrystals can be of small size, highly stable (both over time and over a wide pH range), have a high quantum yield, easily derivatized by further chemical modification of the ligands, and have a low level of non-specific binding to biological structures (e.g., cell surfaces, tissues, proteins, nucleic acids, etc.).

In one aspect, a nanomaterial includes a nanocrystal, and an outer layer including a ligand. The ligand can include a first monomer unit including a first moiety having affinity for a surface of the nanocrystal, a second monomer unit including a second moiety having a high water solubility, and a third monomer unit including a third moiety having a selectively reactive functional group or a selectively binding functional group.

In certain embodiments, the first monomer unit, the second monomer unit, and the third monomer unit can be each different from one another. The ligand can a polymer having a plurality of monomer units, the plurality including the first monomer unit, the second monomer unit, and the third monomer unit. The ligand can be a random copolymer including the first monomer unit, the second monomer unit, and the third monomer unit. The ligand can be a random copolymer consisting essentially of the first monomer unit, the second monomer unit, and the third monomer unit.

The first moiety can be an imidazole moiety, a catechol moiety, a pyridine moiety, a pyrrole moiety, a thiophene moiety, a thiazole moiety, a pyrazine moiety, a carboxylic acid or carboxylate moiety, a naphthyridine moiety, a phosphine moiety, a phosphine oxide moiety, a phenol moiety, a primary amine moiety, a secondary amine moiety, a tertiary amine moiety, an aromatic amine moiety, or a combination thereof.

The ligand can include a polymer including a random copolymer including regions having each of the following formulae:

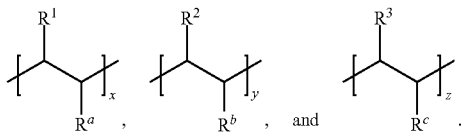

In the copolymer, $R^1$ can be a first moiety having affinity for a surface of the nanocrystal, $R^2$ can be a second moiety having a high water solubility, $R^3$ can be a third moiety having a selectively reactive functional group or a selectively binding functional group, each of $R^a$, $R^b$, and $R^c$, independently, can be substituted or unsubstituted alkyl, substituted or unsubstituted alkoxy, substituted or unsubstituted aryl, or substituted or unsubstituted aryloxy, and each of x, y, and z, independently, a positive integer.

In the copolymer, $x/(x+y+z)$ can be in the range of 0.1 to 0.9, $y/(x+y+z)$ can be in the range of 0.05 to 0.75, and $z/(x+y+z)$ can be in the range of 0.005 to 0.25.

A region of the formula can have of formula (I):

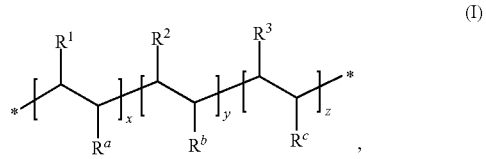

(I)

wherein each of x, y, and z, independently, is an integer selected from group consisting of 1, 2, 3, 4, 5, 6, 7, 8, 9 and 10.

In the ligand, $R^1$ can have the formula $-L^1-T^1$, wherein $L^1$ can be a bond or an alkylene, alkenylene, or arylene linking group having 1 to 8 chain atoms and can be optionally interrupted or terminated by —O—, —S—, —NR$^4$—, —CO—, or a combination thereof, $T^1$ can be an imidazole moiety, a catechol moiety, a pyridine moiety, a pyrrole moiety, a thiophene moiety, a thiazole moiety, a pyrazine moiety, a carboxylic acid or carboxylate moiety, a naphthyridine moiety, a phosphine moiety, a phosphine oxide moiety, a phenol moiety, a primary amine moiety, a secondary amine moiety, a tertiary amine moiety, an aromatic amine moiety, or a combination thereof, and $R^4$ can be hydrogen, hydroxy, alkyl, haloalkyl, alkenyl, alkynyl, cycloalkyl, cycloalkenyl, or aryl.

In the ligand, $R^2$ can have the formula -$L^2$-$T^2$, wherein $L^2$ can be a bond or an alkylene, alkenylene, or arylene linking group having 1 to 8 chain atoms and can be optionally interrupted or terminated by —O—, —S—, —$NR^4$—, —CO—, or a combination thereof; $T^2$ can be [O—$CH_2$—$CHR^5$]$_n$—$R^6$ wherein $R^5$ can be H or $C_1$ to $C_3$ alkyl, and $R^6$ can be H, —OH, $C_1$ to $C_6$ alkyl, $C_1$ to $C_6$ alkoxy, aryl, aryloxy, arylalkyl, or arylalkoxy, and n can be an integer in the range of 0 to 30, and $R^4$ can be hydrogen, hydroxy, alkyl, haloalkyl, alkenyl, alkynyl, cycloalkyl, cycloalkenyl, or aryl.

In the ligand, $R^3$ can have the formula -$L^3$-$T^3$, wherein $L^3$ can be a bond or an alkylene, alkenylene, or arylene linking group having 1 to 8 chain atoms and can be optionally interrupted or terminated by —O—, —S—, —$NR^4$—, —CO—, or a combination thereof, $T^3$ can be [O—$CH_2$—$CHR^7$]$_m$—$R^8$ wherein $R^7$ can be H or $C_1$ to $C_3$ alkyl, and $R^8$ can be $C_1$ to $C_6$ aminoalkyl or $C_1$ to $C_6$ azidoalkyl, and m can be an integer in the range of 0 to 30, and $R^4$ can be hydrogen, hydroxy, alkyl, haloalkyl, alkenyl, alkynyl, cycloalkyl, cycloalkenyl, or aryl.

In the ligand, $R^1$ can have the formula -$L^1$-$T^1$, wherein $L^1$ can be a bond or an alkylene, alkenylene, or arylene linking group having 1 to 8 chain atoms and can be optionally interrupted or terminated by —O—, —S—, —$NR^4$—, —CO—, or a combination thereof, $T^1$ can be an imidazole moiety, a catechol moiety, a pyridine moiety, a pyrrole moiety, a thiophene moiety, a thiazole moiety, a pyrazine moiety, a carboxylic acid or carboxylate moiety, a naphthyridine moiety, a phosphine moiety, a phosphine oxide moiety, a phenol moiety, a primary amine moiety, a secondary amine moiety, a tertiary amine moiety, an aromatic amine moiety, or a combination thereof. $R^2$ can have the formula -$L^2$-$T^2$, wherein $L^2$ can be a bond or an alkylene, alkenylene, or arylene linking group having 1 to 8 chain atoms and can be optionally interrupted or terminated by —O—, —S—, —$NR^4$—, —CO—, or a combination thereof, $T^2$ can be [O—$CH_2$—$CHR^5$]$_n$—$R^6$ wherein $R^5$ can be H or $C_1$ to $C_3$ alkyl, and $R^6$ can be H, —OH, $C_1$ to $C_6$ alkyl, $C_1$ to $C_6$ alkoxy, aryl, aryloxy, arylalkyl, or arylalkoxy, and n can be an integer in the range of 0 to 30. And, $R^3$ can have the formula -$L^3$-$T^3$, wherein $L^3$ can be a bond or an alkylene, alkenylene, or arylene linking group having 1 to 8 chain atoms and can be optionally interrupted or terminated by —O—, —S—, —$NR^4$—, —CO—, or a combination thereof, $T^3$ can be [O—$CH_2$—$CHR^7$]$_m$—$R^8$ wherein $R^7$ can be H or $C_1$ to $C_3$ alkyl; and $R^8$ can be $C_1$ to $C_6$ aminoalkyl or $C_1$ to $C_6$ azidoalkyl, and m can be an integer in the range of 0 to 30, and each $R^4$, independently, can be hydrogen, hydroxy, alkyl, haloalkyl, alkenyl, alkynyl, cycloalkyl, cycloalkenyl, or aryl.

In the ligand, $L^1$, $L^2$, and $L^3$ can be each independently —C(O)NH—$(CH_2)_i$— wherein i is an integer in the range of 0 to 6. $T^1$ can be an imidazolyl moiety. $T^2$ can be —[O—$CH_2$—$CH_2$]$_n$—$OR^6$ wherein n can be an integer in the range of 5 to 25 and $R^6$ can be H, methyl, or ethyl. $T^3$ can be —[O—$CH_2$—$CH_2$]$_m$—$R^8$ wherein $R^8$ is $C_1$ to $C_6$ aminoalkyl or $C_1$ to $C_6$ azidoalkyl, and m can be an integer in the range of 0 to 10.

The nanocrystal can be a semiconductor nanocrystal, semiconductor material, a ceramic material, a magnetic material, or a metallic material.

In another aspect, an aqueous nanomaterial suspension can include the nanomaterial described above, wherein the aqueous nanocrystal suspension can remain stable as an aqueous suspension when stored under ambient conditions for at least 2 months.

In another aspect, a method of making a ligand can include mixing a first monomer or oligomer including a first moiety having affinity for a surface of the nanocrystal, a second monomer or oligomer including a second moiety having a high water solubility, and a third monomer or oligomer including a third moiety having a selectively reactive functional group or a selectively binding functional group, and forming a ligand from the first monomer or oligomer, the second monomer or oligomer, and the third monomer oligomer.

In another aspect, a method of making a nanomaterial can include contacting the ligand with a nanocrystal.

In another aspect, a ligand can include a polymer including a random copolymer including regions having each of the following formulae:

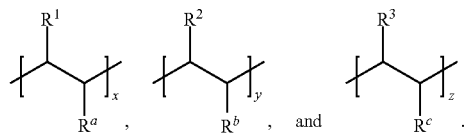

wherein $R^1$ is a first moiety having affinity for a surface of the nanocrystal, $R^2$ is a second moiety having a high water solubility, $R^3$ is a third moiety having a selectively reactive functional group or a selectively binding functional group, each of $R^a$, $R^b$, and $R^c$, independently, is substituted or unsubstituted alkyl, substituted or unsubstituted alkoxy, substituted or unsubstituted aryl, or substituted or unsubstituted aryloxy, and each of x, y, and z, independently, a positive integer.

Other features, objects, and advantages of the invention will be apparent from the description and drawings, and from the claims.

BRIEF DESCRIPTION OF THE DRAWINGS

FIGS. 1A-1C are schematic depictions of nanocrystals.

FIG. 6A was taken after initial ligand exchange and FIG. 6B after 1 week storage at 4° C. in the dark. Increasing titration of His-Tagged streptavidin runs from left to right on each gel, showing sharp and discrete bands in the initially prepared sample, but loss of fidelity after storage. Nanocrystals in FIG. 6B also exhibited increased non-specific binding to cells.

FIG. 11A shows ensemble labeling at high nanocrystal concentration. FIG. 11B, same as in FIG. 11A, but with nanocrystals pre-incubated with biotin. FIG. 11C, low nanocrystal concentration labeling, showing emission from single nanocrystals with low background (inset).

FIG. 15A, dynamic light scattering analysis showing a diameter of ~25 nm. FIG. 15B, TEM image of aqueous, polymer-coated $\gamma$-Fe$_2$O$_3$.

DETAILED DESCRIPTION

Semiconductor nanocrystals are a powerful class of fluorophores exhibiting high quantum yields, large molar extinction coefficients, exceptional photo-stability, and tunable emission wavelengths across the visible and near-IR spectral window.[1-4] These properties make semiconductor nanocrystals attractive candidates as biological fluorescent tags,[3, 5, 6] especially since their exceptional brightness enables single molecule tracking over extended periods of time.[7-9] However, a major barrier towards the wide-spread use of semiconductor nanocrystals in these applications has been the difficulty in simultaneously optimizing five desirable nanocrystal properties for fluorescence labeling in live-cells: small size, high stability (both over time and in a wide pH range), high quantum yield, facile derivatizabilty, and low non-specific binding.

Figure 2:
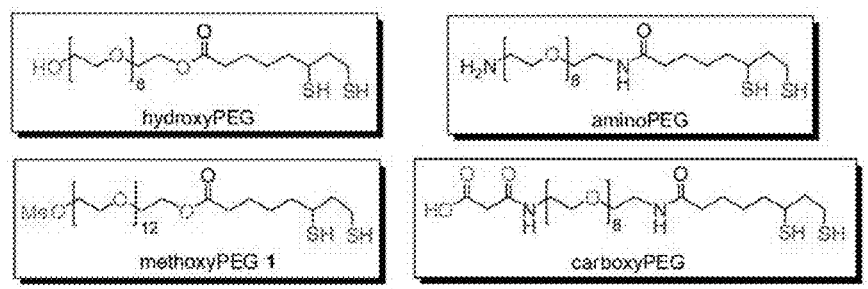
FIG. 2 depicts structures of several DHLA-based nanocrystal ligands.

While it has been possible to achieve three or four of these criteria, achieving all five simultaneously has been a challenge in ligand engineering. Commercial nanocrystals encapsulated with amphiphlic polymer coatings are easily derivatizable and are suitable for single molecule imaging,[7, 10] but can have sizes between 20-30 nm in diameter,[11] which can limit the access of QDs to crowded regions such as the neuronal synapse, as well as potentially alter the native behavior of labeled receptors.[12-14] Smaller nanocrystals have been achieved via ligand exchange with thiol-based small molecule ligands, but such ligands can be unstable due to the weak interaction of mono-thiols with the nanocrystal surface.[15, 16] The bidentate thiol binding motif of DHLA can increase stability.[17] Recently, aqueous nanocrystals that are compact, biocompatible, derivatizable, and exhibit very low non-specific binding using a suite of DHLA-PEG derived ligands (FIG. 2) have been described.[18-20] Most thiol-based coordinating ligands, however, are inherently unstable. The thiol group can undergo oxidation and dimerization, causing the ligand to detach from the nanocrystal surface over time. Multi-dentate polymer ligands can obviate the need for thiols, while maintaining the desirable nanocrystal properties including small size, low non-specific binding, derivatizability, and high quantum yield.

A nanocrystal can have an approximately spherical shape, as illustrated (in cross-section) in FIG. 1A. Nanocrystal 100 includes core 110 that can be a first semiconductor material. Core 110 is optionally overcoated by a second material 120, such as a second semiconductor material. Ligand layer 130 includes organic compounds with affinity for a nanocrystal surface. The organic compounds can be selected for desired properties, such as solubility in a desired solvent or a desired reactivity.

The nanocrystal can be a member of a population of nanocrystals having a narrow size distribution. The nanocrystal can be a sphere, rod, disk, or other shape. The nanocrystal can include a first semiconductor material, a ceramic material, a magnetic material, or a metallic material, for example, gold, iron oxide, titanium dioxide, cerium oxide or other metal chalcogenide or pnictide. The nanocrystal can include a first semiconductor material having the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof. The first semiconductor material can include a Group II-VI compound, a Group II-V compound, a Group III-VI compound, a Group III-V compound, a Group IV-VI compound, a Group I-III-VI compound, a Group II-IV-VI compound, a Group II-IV-V compound, or mixtures thereof. For example, the first semiconductor material can include for example, ZnO, ZnS, ZnSe, ZnTe, CdO, CdS, CdSe, CdTe, MgO, MgS, MgSe, MgTe, HgO, HgS, HgSe, HgTe, AN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof.

In some embodiments, the nanocrystal includes a first semiconductor material including a Group I-III-VI compound. For example, the first semiconductor material can include for example, a copper indium diselenide such as a doped copper indium diselenide or other copper indium diselenide, or alloyed copper indium diselenide, such as, for example, copper indium zinc diselenide, or copper indium gallium diselenide. The first semiconductor material can include a copper indium disulfide such as a doped copper indium disulfide or other copper indium disulfide, or alloyed copper indium disulfide. Other elements alloyed with copper indium diselenide and/or copper indium disulfide can include sulfur, aluminum, or silver; for example, $CuInS_2$, $CuIn(S, Se)_2$, $Cu(In,Al)Se_2$, $Cu(In,Ag)Se_2$, or others.

The nanocrystal can include a second semiconductor material. The second semiconductor material can a composition different from the composition of the first semiconductor material. The first and second semiconductor materials can be selected to provide a desired band structure, such as a type I or a type II heterostructure. The second semiconductor material can be adjacent to the first semiconductor material, such that a junction is formed. The junction can be abrupt or graded. In a graded junction, the first material blends with the second material in the junction, providing a graded change in material. In contrast, in an abrupt junction there is little or substantially no blending of the materials.

The second semiconductor material of the nanocrystal can include a Group II-VI compound, a Group II-V compound, a Group III-VI compound, a Group III-V compound, a Group IV-VI compound, a Group I-III-VI compound, a Group II-IV-VI compound, a Group II-IV-V compound, or mixtures thereof. For example, the second semiconductor material can include ZnO, ZnS, ZnSe, ZnTe, CdO, CdS, CdSe, CdTe, MgO, MgS, MgSe, MgTe, HgO, HgS, HgSe, HgTe, AN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof. For example, ZnS, ZnSe or CdS overcoatings can be grown on CdSe or CdTe nanocrystals.

An alloy can have the formula $M^1_i M^2_j M^3_k E^1_x E^2_y E^3_z$. $M^1$, $M^2$ and $M^3$ can each independently be a group I, group II, group III, or group IV element. $E^1$, $E^2$ and $E^3$ each independently can be a group IV, group V, or group VI element. For example, $M^1$, $M^2$ and $M^3$ can each independently be magnesium, zinc, copper, cadmium, mercury, aluminum, gallium, indium, thallium, silicon, germanium, tin, or lead; and $E^1$, $E^2$ and $E^3$ each independently can be silicon, germanium, tin, lead, nitrogen, phosphorus, arsenic, antimony, oxygen, sulfur, selenium, or tellurium.

In general, the values of i, j, k, x, y, and z are non-negative. In some instances, the value of i, j, k, x, y, or z can be an integer. For example, an alloy can have the formula $M^1 E^1_x E^2_y$. In this formula, the value of i is 1 and the values of j and k are zero (alternatively, $M^1$, $M^2$ and $M^3$ are identical), and the value of z is zero (alternatively, $E^2$ and $E^3$ are identical). The sum of i, j and k can be an integer, and the sum of x, y and z can be an integer. For example, if the sum of x and y is 1, the preceding formula can be expressed as $M^1 E^1_x E^2_{1-x}$. In another example, an alloy can have the formula $M^1_i M^2_{1-i} E^1$. An alloy can have the formula $M^1_i M^2_j M^3_k E^1_x$ or $M^1_i M^2_j M^3_k E^1_x E^2_y$.

FIG. 1B depicts a side view of a rod-shaped nanocrystal 150. Nanocrystal 150 can includes a first semiconductor material 160. For simplicity, the ligand layer on nanocrystal 150 has been omitted from FIG. 1B. FIG. 1C depicts barbell-shaped nanocrystal 200. Barbell-shaped nanocrystals can also be described as dumbbell-shaped, or as nanobarbells or nanodumbbells. Nanocrystal 200 includes a central region 160 including first semiconductor material, and distal regions 170 including a second semiconductor material. Nanocrystal 200 can be prepared by adding a second semiconductor material to the ends of rod-shaped nanocrystal 150.

FIG. 1C is a schematic depiction of nanocrystals with two substantially similar distal regions at each end of a rod-shaped central region. Alternatively, nanocrystals can be prepared where only one end of a rod-shaped nanocrystal is modified with a second semiconductor material. Distal regions 170 can be approximately spherical ("dots") or approximately rod-shaped as shown in FIG. 1C. Nanocrystal 200 can be referred as barbell shaped whether the distal regions are approximately spherical or rod-shaped. If distal regions 170 are rod-shaped, distal regions 170 can have approximately the same diameter as the central region. In either case, a nanocrystal having a central region and a distal region (or regions) can be described by a length ratio. The length ratio can be defined as the length of the central region divided by the total length of the nanocrystal. When referring to a population of nanocrystals, a length ratio can be an aggregate length ratio for the population (e.g., a mean length ratio, median length ratio, or rms length ratio for the population). The central region can have length in the range of 3 nm to 100 nm (such as between 5 nm and 40 nm), and the distal region can have a radius in the range of 1 nm to 10 nm (such as between 1.5 nm and 5 nm). Accordingly, the nanocrystal can have a length ratio in the range of 0.1 to 0.95 (such as between 0.2 and 0.9). See, for example, U.S. Patent Application Publication No. 2007/0152236, which is incorporated by reference in its entirety.

A nanocrystal having a central region and a distal region (or regions) can be described by a radius ratio. The radius ratio can be defined as the ratio of the radius of the distal region to the radius of the central region. The central region can have a radius in the range of 1 nm to 7 nm (such as between 1.5 nm and 5 nm), and the distal regions can have a radius in the range of 1 nm to 10 nm (such as between 1.5 nm and 5 nm). Accordingly, a barbell-shaped nanocrystal can have a radius ratio in the range of 0.1 to 10 (such as between 0.3 and 3.5). In some embodiments the radius ratio can be about 1. In other embodiments it can be substantially different than about 1, such as, for example, between 0.1 and 0.95 or between 1.05 and 10.

The junction between two semiconductor materials can have different configurations depending on the shape of the nanocrystal. For example, a spherical nanocrystal can have a spherical core of a first semiconductor material coated with a shell of a second semiconductor material. A rod shaped nanocrystal can have a rod of a first semiconductor material and a second semiconductor material. The second semiconductor material can coat the length and ends of the rods substantially evenly. Alternatively, the length and ends of the rod can be coated to different degrees. In particular, the ends of the rod can coated to a greater degree than the length of the rod. The ends of the rod each can be coated by an approximately spherical region of a second semiconductor material. In this case, the nanocrystal can have a barbell shape.

The emission from the nanocrystal can be a narrow Gaussian emission band that can be tuned through the complete wavelength range of the ultraviolet, visible, or infrared regions of the spectrum by varying the size of the nanocrystal, the composition of the nanocrystal, or both. For example, CdSe can be tuned in the visible region and InAs can be tuned in the infrared region.

The population of nanocrystals can have a narrow size distribution. The population can be monodisperse and can exhibit less than a 15% rms deviation in size of the nanocrystals, preferably less than 10%, more preferably less than 5%. Spectral emissions in a narrow range of between 10 and 150 nm full width at half max (FWHM) can be observed (in other words, FWHM of less than 0.05 eV, or of less than 0.03 eV). Semiconductor nanocrystals can have emission quantum efficiencies of greater than 2%, 5%, 10%, 20%, 40%, 60%, 70%, or 80%.

The method of manufacturing a nanocrystal can be a colloidal growth process and can produce a monodisperse particle population. Colloidal growth occurs by rapidly injecting an M donor(s) and an E donor(s) into a hot coordinating agent. In another variation, the M donor or M donors are dissolved in a hot coordinating agent, and an E donor or E donors are rapidly injected. The injection produces a nucleus that can be grown in a controlled manner to form a nanocrystal. The reaction mixture can be gently heated to grow and anneal the nanocrystal. Both the average size and the size distribution of the nanocrystals in a sample are dependent on the growth temperature. The growth temperature necessary to maintain steady growth increases with increasing average crystal size. Preparation and manipulation of nanocrystals are described, for example, in U.S. Pat. No. 6,322,901, which is incorporated by reference in its entirety.

The nanocrystal is a member of a population of nanocrystals. As a result of the discrete nucleation and controlled growth, the population of nanocrystals obtained can have a narrow, monodisperse distribution of sizes. The process of controlled growth and annealing of the nanocrystals in the coordinating agent that follows nucleation can also result in uniform surface derivatization and regular core structures. As the size distribution sharpens, the temperature can be raised to maintain steady growth. By adding more M donor or E donor, the growth period can be shortened.

The M donor(s) can be an inorganic compound, an organometallic compound (e.g., an alkyl metal compound such as triethyl gallium or trimethyl indium), or elemental metal. The inorganic compound can be a salt (e.g., a carboxylate salt, an acetylacetonate salt, a metal halide, a metal oxide, a metal alkoxide, and the like). The salt can be combined with a coordinating agent, such as an amine. See, for example, U.S. Pat. No. 6,576,291, which is incorporated by reference in its entirety. M can be cadmium, zinc, copper, magnesium, mercury, aluminum, gallium, indium or thallium. The E donor(s) can be a compound capable of reacting with the M donor to form a material with the general formula $M^1_i M^2_j M^3_k E^1_x E^2_y E^3_z$. Typically, the E donor is a chalcogenide donor or a pnictide donor, such as a phosphine chalcogenide, a bis(silyl)chalcogenide, dioxygen, an ammonium salt, or a tris(silyl)pnictide. Suitable E donors include dioxygen, bis(trimethylsilyl)selenide ($(TMS)_2Se$), trialkyl phosphine selenides such as (tri-n-octylphosphine)selenide (TOPSe) or (tri-n-butylphosphine)selenide (TBPSe), trialkyl phosphine tellurides such as (tri-n-octylphosphine)telluride (TOPTe) or hexapropylphosphorustriamide telluride (HPPTTe), bis(trimethylsilyl)telluride ($(TMS)_2Te$), bis(trimethylsilyl)sulfide ($(TMS)_2S$), a trialkyl phosphine sulfide such as (tri-n-octylphosphine)sulfide (TOPS), an ammonium salt such as an ammonium halide (e.g., $NH_4Cl$), tris(trimethylsilyl)phosphide ($(TMS)_3P$), tris(trimethylsilyl)arsenide ($(TMS)_3As$), or tris(trimethylsilyl)antimonide ($(TMS)_3Sb$). In certain embodiments, the M donor and the E donor can be moieties within the same molecule.

A coordinating agent can help control the growth of the nanocrystal. The coordinating agent is a compound having a donor lone pair that, for example, has a lone electron pair available to coordinate to a surface of the growing nanocrystal. The coordinating agent can be a solvent. Solvent coordination can stabilize the growing nanocrystal. Typical coordinating agents include alkyl phosphines, alkyl phosphine oxides, alkyl phosphonic acids, or alkyl phosphinic acids, however, other coordinating agents, such as pyridines, furans, and amines may also be suitable for the nanocrystal production. Examples of suitable coordinating agents include pyridine, tri-n-octyl phosphine (TOP) and tri-n-octyl phosphine oxide (TOPO). Technical grade TOPO can be used.

Nanocrystal shape can be determined by synthesis conditions, notably by the coordinating solvent(s) present during nanocrystal synthesis. The nanocrystal can be a sphere, rod, disk, or other shape. See, e.g., U.S. Pat. Nos. 6,225,198; 6,306,736; and 6,855,202, each of which is incorporated by reference in its entirety. Nanocrystal shape can be further controlled by the conditions under which a second semiconductor material is added to the nanocrystal.

Size distribution during the growth stage of the reaction can be estimated by monitoring the absorption line widths of the particles. Modification of the reaction temperature in response to changes in the absorption spectrum of the particles allows the maintenance of a sharp particle size distribution during growth. Reactants can be added to the nucleation solution during crystal growth to grow larger crystals. By stopping growth at a particular nanocrystal average size, a population having a desired average nanocrystal size can be obtained.

The particle size distribution can be further refined by size selective precipitation with a poor solvent for the nanocrystals, such as methanol/butanol as described in U.S. Pat. No. 6,322,901, incorporated herein by reference in its entirety. For example, nanocrystals can be dispersed in a solution of 10% butanol in hexane. Methanol can be added dropwise to this stirring solution until opalescence persists. Separation of supernatant and flocculate by centrifugation produces a precipitate enriched with the largest crystallites in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected nanocrystal population can have no more than a 15% rms deviation from mean size, preferably 10% rms deviation or less, and more preferably 5% rms deviation or less.

A cap including a second semiconductor material can be added to the nanocrystal. A capping process is described, for example, in U.S. Pat. No. 6,322,901, which is incorporated by reference in its entirety. By adjusting the temperature of the reaction mixture during capping and monitoring the absorption spectrum of the core, capped materials having high emission quantum efficiencies and narrow size distributions can be obtained. The shape of the cap can depend on the shape of the initial nanocrystal and the capping conditions used. For example, a cap grown on an approximately spherical nanocrystal can also be approximately spherical. In this case, the cap can substantially coat the spherical nanocrystal. If the initial nanocrystal is rod-shaped, the cap can be grown primarily on the ends of the rod and very little of the second semiconductor material added along the axis of the rod. A rod-shaped nanocrystal can be capped with a rod-shaped cap, or with an approximately spherical cap. Capping conditions, such as solvent composition and temperature, can determine the shape of the cap. For example, when caps are added under conditions that favor rod-shaped growth, rod-shaped caps can be formed; in contrast, approximately spherical caps are formed when the capping conditions favor approximately spherical growth.

It can be advantageous to purify nanocrystals before a second material is added to the nanocrystal. As discussed above, the nanocrystals can be purified by size-selective precipitation. After purification the nanocrystals can be treated with an etching agent. The etching agent can reduce the number of defect sites on the nanocrystals. Defect sites can act as undesired nucleation sites during addition of a second material. In making barbell-shaped nanocrystals, nucleation is desired at the ends of rods, but defect sites can cause nucleation along the length of a rod. Because the etching agent reduces the number of defect sites, the resulting barbells will have fewer warts along the length of the rods than barbells prepared without a prior etching treatment. The etching agent can be an amine, such as a primary amine, e.g., octylamine. An etching agent can be included during addition of a second semiconductor material to a nanocrystal.

Two-pot synthesis of nanocrystals can improve (compared to one-pot synthesis) the quality of the heterojunction by minimizing contamination of the one material with the other material. Adding the nanocrystals at temperatures normally used for core growth (rather than nucleation) can reduce overcoating of a rod (e.g., along the length of the rod) by the second semiconductor material.

Transmission electron microscopy (TEM) can provide information about the size, shape, and distribution of the nanocrystal population. Powder X-ray diffraction (XRD) patterns can provided the most complete information regarding the type and quality of the crystal structure of the nanocrystals. Estimates of size are also possible since particle diameter is inversely related, via the X-ray coherence length, to the peak width. For example, the diameter of the nanocrystal can be measured directly by transmission electron microscopy or estimated from X-ray diffraction data using, for example, the Scherrer equation. It also can be estimated from the UV/Vis absorption spectrum.

The outer surface of the nanocrystal can include a layer of compounds derived from the coordinating agent used during the growth process. The surface can be modified by repeated exposure to an excess of a competing coordinating group to form an overlayer. For example, a dispersion of the nanocrystal can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the nanocrystal, including, for example, phosphines, thiols, amines and phosphates. The nanocrystal can be exposed to short chain polymers which exhibit an affinity for the surface and which terminate in a moiety having an affinity for a suspension or dispersion medium. Such affinity improves the stability of the suspension and discourages flocculation of the nanocrystal.

In general, a ligand for a nanocrystal can include a first monomer unit including a first moiety having affinity for a surface of the nanocrystal, a second monomer unit including a second moiety having a high water solubility, and a third monomer unit including a third moiety having a selectively reactive functional group or a selectively binding functional group. In this context, a "monomer unit" is a portion of a polymer derived from a single molecule of a monomer. For example, a monomer unit of poly(ethylene) is —$CH_2CH_2$—, and a monomer unit of poly(propylene) is —$CH_2CH(CH_3)$—. A "monomer" refers to the compound itself, prior to polymerization, e.g., ethylene is a monomer of poly(ethylene) and propylene of poly(propylene).

A selectively reactive functional group is one that can form a covalent bond with a selected reagent under selected conditions. One example of a selectively reactive functional group is a primary amine, which can react with, for example, a succinimidyl ester in water to form an amide bond. A selectively binding functional group is a functional group that can form a noncovalent complex with a selective binding counterpart. Some well known examples of selectively binding functional groups and their counterparts include biotin and streptavidin; a nucleic acid and a sequence-complementary nucleic acid; FK506 and FKBP; or an antibody and its corresponding antigen.

A moiety having high water solubility typically includes one or more ionized, ionizable, or hydrogen bonding groups, such as, for example, an amine, an alcohol, a carboxylic acid, an amide, an alkyl ether, a thiol, or other groups known in the art. Moieties that do not have high water solubility include, for example, hydrocarbyl groups such as alkyl groups or aryl groups, haloalkyl groups, and the like. High water solubility can be achieved by using multiple instances of a slightly soluble group: for example, diethyl ether is not highly water soluble, but a poly(ethylene glycol) having multiple instances of a —$CH_2$—O—$CH_2$-alkyl ether group can be highly water soluble.

For example, the ligand can include a polymer including a random copolymer. The random copolymer can be made using any method of polymerization, including cationic, anion, radical, metathesis or condensation polymerization, for example, living cationic polymerization, living anionic polymerization, ring opening metathesis polymerization, group transfer polymerization, free radical living polymerization, living Ziegler-Natta polymerization, or reversible addition fragmentation chain transfer (RAFT) polymerization. The random copolymer can include regions having each of the following formulae:

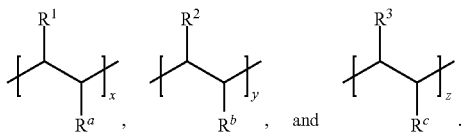

In these regions, $R^1$ is a first moiety having affinity for a surface of the nanocrystal, $R^2$ is a second moiety having a high water solubility, $R^3$ is a third moiety having a selectively reactive functional group or a selectively binding functional group, each of $R^a$, $R^b$, and $R^c$, independently, is substituted or unsubstituted alkyl, substituted or unsubstituted alkoxy, substituted or unsubstituted aryl, or substituted or unsubstituted aryloxy; and each of x, y, and z, independently, a positive integer.

Polyhistidine motifs can have high affinity a nanocrystal surface (e.g., when the surface includes Cd and/or Zn, or other Group II elements), and $His_6$-tags have been employed for facile and efficient derivatization of nanocrystals with peptides, dyes, and proteins.[21-24] A polymer rich with imidazole groups can achieve efficient and multi-dentate binding to a nanocrystal surface. The polyimidazole motif can be advantageous because it is not susceptible to the issues plaguing thiol-based chemistry, such as degradation by oxidation. Furthermore, multidentate binding by a polyhistidine can greatly enhance stability.[25] To promote water solubility and reduce non-specific binding,[26] a PEG derived monomer can be co-polymerized along with an imidazole-based monomer to form a co-polymer displaying both PEG and imidazole groups along the backbone. Using an additional monomer featuring an amine or a biotin functional group, a 3-component multi-functional co-polymer can be synthesized for nanocrystal water solubilization and derivatization. Radical addition fragmentation chain transfer (RAFT) polymerization chemistry can provide molecular weight control and narrow polydispersity of the co-polymer. The RAFT agent can also mediate polymerization of a wide diversity of monomers for controlled co-polymerization.[27] By tuning the ratio and composition of monomers, complex co-polymers can be assembled with the desired properties for nanocrystal water solubilization and derivatization, form compact nanocrystals suitable for live cell and in-vivo imaging with extremely low non-specific binding and greatly enhanced stability and long-term shelf-life. By using a catechol group instead of imidazole for binding (FIG. 4), iron oxide nanocrystals can also be solublized. The length of PEG chain can be chosen in part based on the size of the nanocrystal involved—larger nanocrystals can require longer PEG chains for solubility.

EXAMPLES

Example 1

Instability of DHLA-Based Ligands

Figure 6:
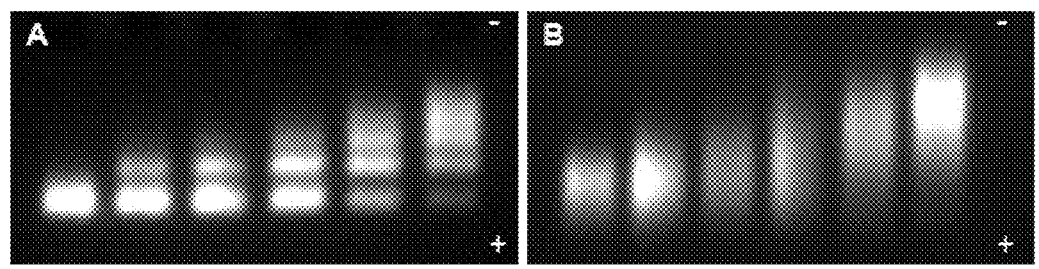
FIGS. 6A-6B show photographs of carboxyPEG nanocrystals separated by gel electrophoresis.

A manifestation of the instability of DHLA based ligands can been seen in the gel electrophoresis of carboxyPEG coated nanocrystals (FIG. 6). When initially prepared, carboxyPEG nanocrystals exhibited sharp bands by gel electrophoresis, and a titration of increasing amounts of $His_6$-Tagged streptavidin produced discrete bands.[21] While this system worked as reported for high-affinity cell labeling with low non-specific binding, gel electrophoresis of the same carboxyPEG nanocrystal sample exhibited broadened bands after ~1 week storage, indicating a fluctuation in charge owing to a heterogeneous distribution of ligand density, most likely due to ligand detachment from the nanocrystal surface. Along with band broadening by gel electrophoresis, a concomitant increase in non-specific binding to HeLa cells was observed, consistent with loss of ligand binding to the nanocrystals.

Example 2

Monomer Synthesis and Polymerization

Figure 3:
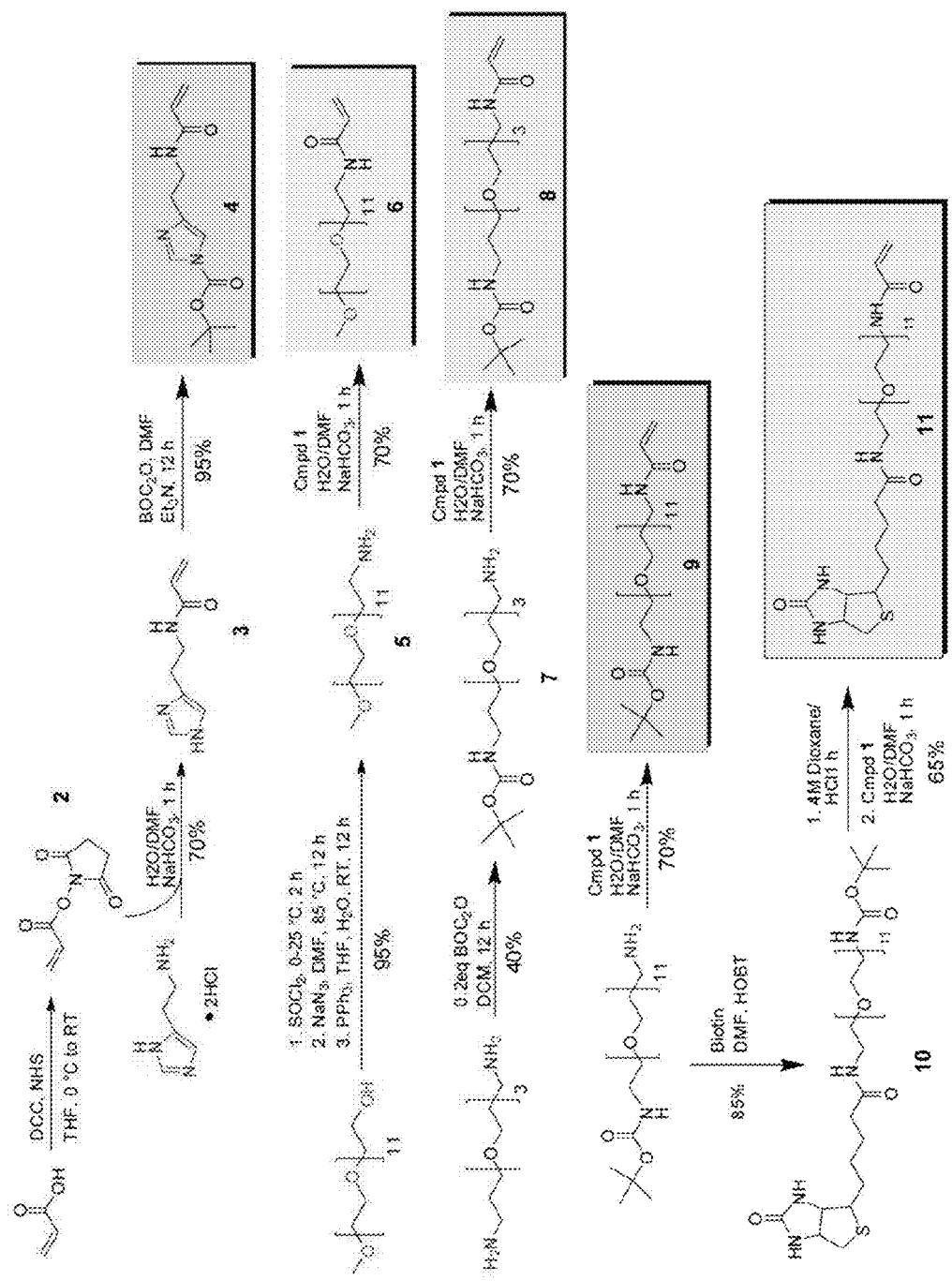
FIGS. 3-4 depicts structures and syntheses of monomeric compounds useful for preparing polymeric nanocrystal ligands.
Figure 4:
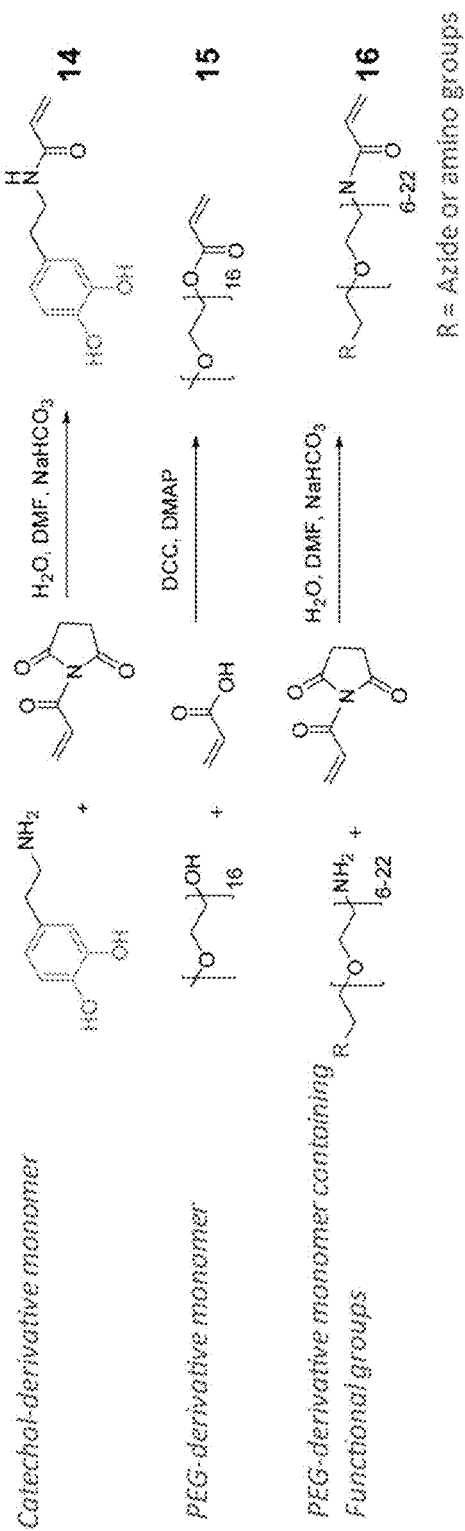

Monomers were prepared by coupling of acrylic acid to primary amine bearing moieties via an amide bond forming reaction (FIGS. 3-4). Conjugate addition to the vinyl group was minimized by first preparing the NHS-ester of acrylic acid, and allowing the coupling reaction to proceed at 4° C. for only 30 minutes, upon which complete consumption of the starting materials was confirmed by TLC. The monomer 3 containing the imidazole group for nanocrystal binding was obtained from the reaction of histamine with compound 2. Since the trithiocarbamate RAFT agent 12 used in the polymerization reaction[28] is highly sensitive towards degradation by aminolysis, the imidazole nitrogen was BOC protected to yield the final monomer 4. Likewise, monomer 6 containing a $PEG_{11}$ group for water solubility was obtained first via the conversion of the terminal hydroxyl group of mono-methoxy PEG to a primary amine (compound 4), followed by reaction with compound 2. The formation of an amide bond over an ester bond between acrylic acid and the PEG chain was preferable due to the possibility of ester hydrolysis under the highly acidic BOC deprotection conditions. Monomers 8 and 9 with BOC-protected terminal amines were also synthesized in order to afford polymers bearing primary amine groups for derivatization with FRET dyes or proteins, respectively. Finally, to demonstrate the scope of monomer incorporation in the polymerization reaction scheme, monomer 11 was synthesized to give polymers functionalized with biotin for binding assays.

Figure 5:
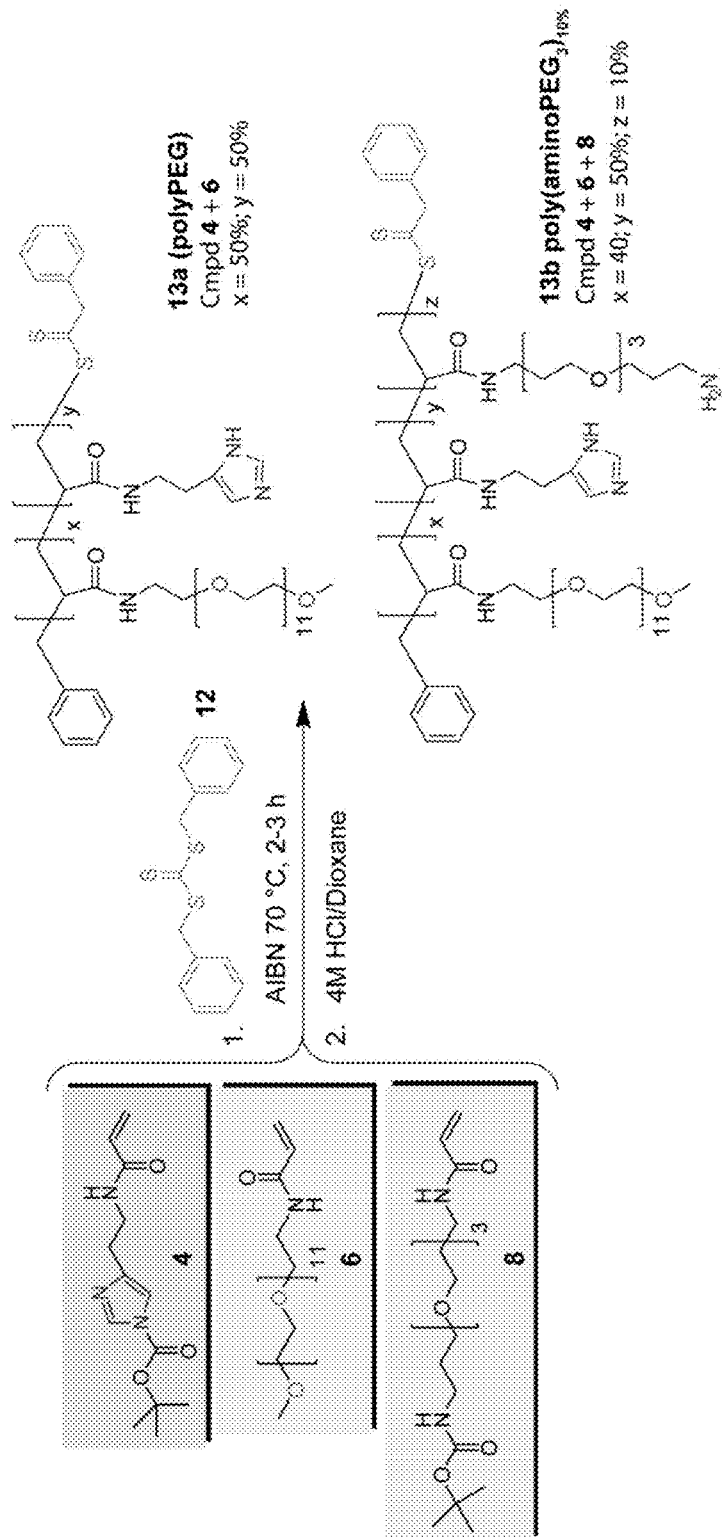
FIG. 5 depicts structures and syntheses of polymeric nanocrystal ligands.
Figure 7:
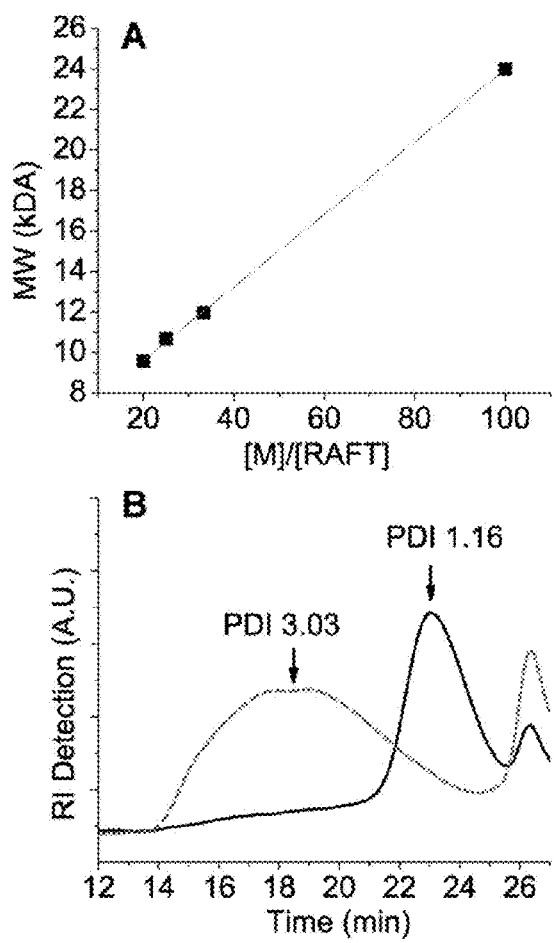
FIG. 7A is a graphs describing RAFT polymerization of the two-component system 4+6 in equimolar ratio showing tunable polymer MW as a function of [Monomer] to [RAFT] ratio.
FIG. 7B is a graph depicting GPC results for the resulting polymer in DMF, showing narrow polydispersity with a [M]/[RAFT] ratio of 30:1 and [AIBN]:[RAFT] ratio of 1:1 (solid line), and poor MW distribution without RAFT agent (dashed line).
Figure 16:
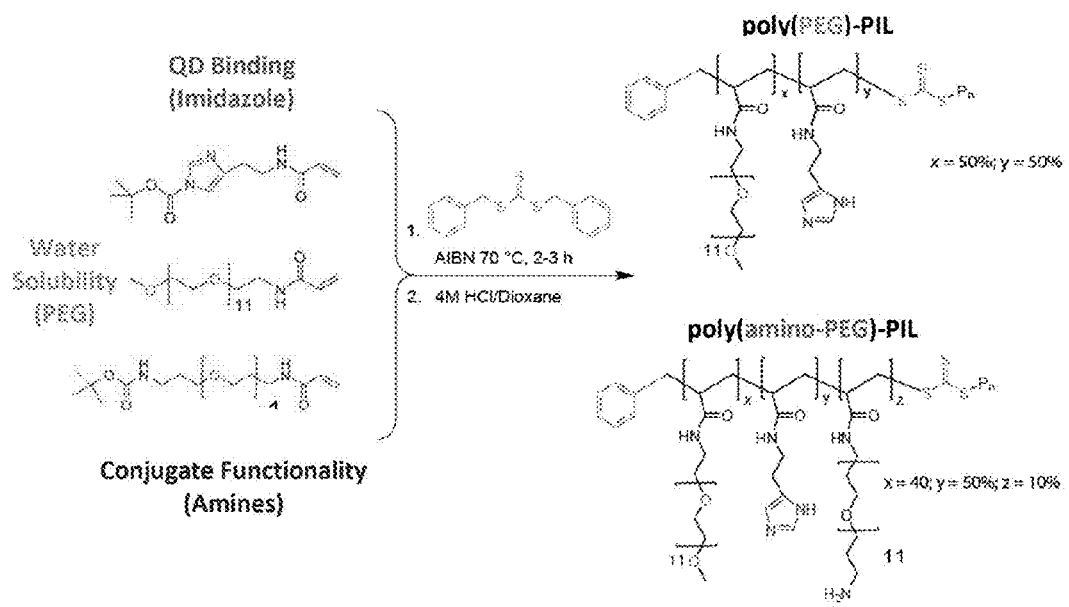
FIG. 16 depicts structures and syntheses of polymeric nanocrystal ligands.

For the polymers discussed below, the initial monomer mixture contained 50% mole fraction of imidazole monomer 4 (to ensure sufficient imidazole groups for effective binding to the nanocrystal surface), with the remaining 50% mole fraction being a mixture of monomer 6 (for water solubility), with either 8, 9, or 11 (for derivatizability). In order to minimize potential cross-linking and aggregation of nanocrystals during ligand exchange due to long polymer chains binding multiple nanocrystals, the polymer MW was kept low, with a targeted degree of polymerization (DP) below 30. MW control was achieved by conducting the AIBN-initiated radical polymerization in the presence of a radical addition fragmentation chain transfer (RAFT) mediator 12 to afford a controlled living polymerization (FIG. 5).[28] Using an [AIBN]/[RAFT] ratio of 0.25:1 and an equimolar mixture of monomers 4 and 6, the overall polymer conversion efficiency over time (monitored by $^1$H-NMR spectroscopy) followed a linear relationship. The [M]/[RAFT] ratio versus measured polymer molecular weight using GPC also followed a linear relationship (FIG. 7A), showing good size control even at 1:1 [AIBN]/[RAFT] conditions, and showed a narrow PDI<1.2 (FIG. 7B). The same polymerization carried out in the absence of RAFT agent yielded a poorly controlled polydisperse polymer, confirming that the RAFT agent is responsible for mediation of polymerization even under such high relative initiator concentrations (FIG. 7B). Thus, in order to rapidly prototype new polymers, all polymerizations were carried out under an [AIBN]/[RAFT] ratio of 1:1. Similar copolymers were made with compounds 4/6/9, respectively, as shown in FIG. 16.

For convenience, the nomenclature of copolymer described here use following abbreviations—poly(PEG): 50/50 mole fraction compounds 4/6, respectively; poly(aminoPEG$_3$)$_{10\%}$: 50/40/10 mole fraction of compounds 4/6/8, respectively; poly(aminoPEG$_{11}$)$_{25\%}$: 50/25/25 mole fraction of compounds 4/6/9, respectively; and poly(biotinPEG)$_{25\%}$: 50/25/25 mole fraction of compounds 4/6/11, respectively (Table 1).

TABLE 1

| Nomenclature | Monomer Composition by mole % |
|---|---|
| Poly(PEG) | 50% Cmpd 6/50% Cmpd 4 |
| Poly(aminoPEG$_3$)$_{10\%}$ | 10% Cmpd 8/40% Cmpd 6/50% Cmpd 4 |
| Poly(aminoPEG$_{11}$)$_{25\%}$ | 25% Cmpd 9/25% Cmpd 6/50% Cmpd 4 |
| Poly(biotinPEG)$_{25\%}$ | 25% Cmpd 11/25% Cmpd 6/50% Cmpd 4 |

For nanocrystal water solubilization, all polymer MWs were typically ~14 kDa with PDI<1.2 as measured by GPC using polystyrene MW standards. Since the relative reaction rates of the monomers within the co-polymerization mixture could not be determined due to overlapping NMR signals of the monomers, polymerizations were performed to >90% conversion efficiency to ensure the incorporation of all monomers in the mixture. It was not determined whether the monomers are incorporated in a purely statistical fashion, or if there is some local ordering of monomer units in the polymer microstructure.

Unlike thiol based ligands (e.g., DHLA based ligands), the class of polymers presented here are amenable to long-term storage under ambient conditions without special precautions against degradation. Thiol based ligands slowly oxidize over time and often need to be re-treated with reducing agents to retain functionality for nanocrystal water solubilization, even when carefully stored in dark at 4° C.

Example 3

Ligand Exchange and Characterization of Aqueous Nanocrystals

Ligand exchange of CdSe(CdZnS) core(shell) nanocrystals[19] with a peak emission wavelength of 605 nm, using poly(PEG) was performed by displacing the native hydrophobic ligands with the imidazole groups along the polymer backbone, which can bind in a multi-dentate fashion to the Cd and Zn rich nanocrystal surface. Ligand exchange conditions were relatively mild, and involved stirring a mixture of nanocrystals and poly(PEG) in a solution of chloroform at room temperature, followed by addition of methanol and precipitation using chloroform and hexanes. Complete ligand displacement was achieved within 1 h. H$^1$ NMR spectroscopy confirmed complete ligand exchange by revealing the disappearance of the original aliphatic protons of TOP/TOPO coated nanocrystals after ligand exchange with poly(PEG), followed by water solublization and purification by dialysis. A control experiment using a polymer of 6 alone did not yield water soluble nanocrystals. Ligand exchange of poly(PEG) with CdSe(CdS) core(shell) nanocrystals also proceeded smoothly. The presence of a high quality CdS shell applied using a modified SILAR approach[29, 30] contributed significantly to the absorbance cross-section of blue nanocrystals (e.g., peak emission at 450 nm) and can be advantageous for increased brightness in single molecule imaging applications. In addition, a robust shell can greatly improve the QY of nanocrystals after phase transfer to water. Indeed, the QY of CdSe(CdS) nanocrystals after ligand exchange with poly (PEG) was in excess of 65% in water, a modest drop from a QY of 90% in octane (FIG. 8B).

Figure 8:
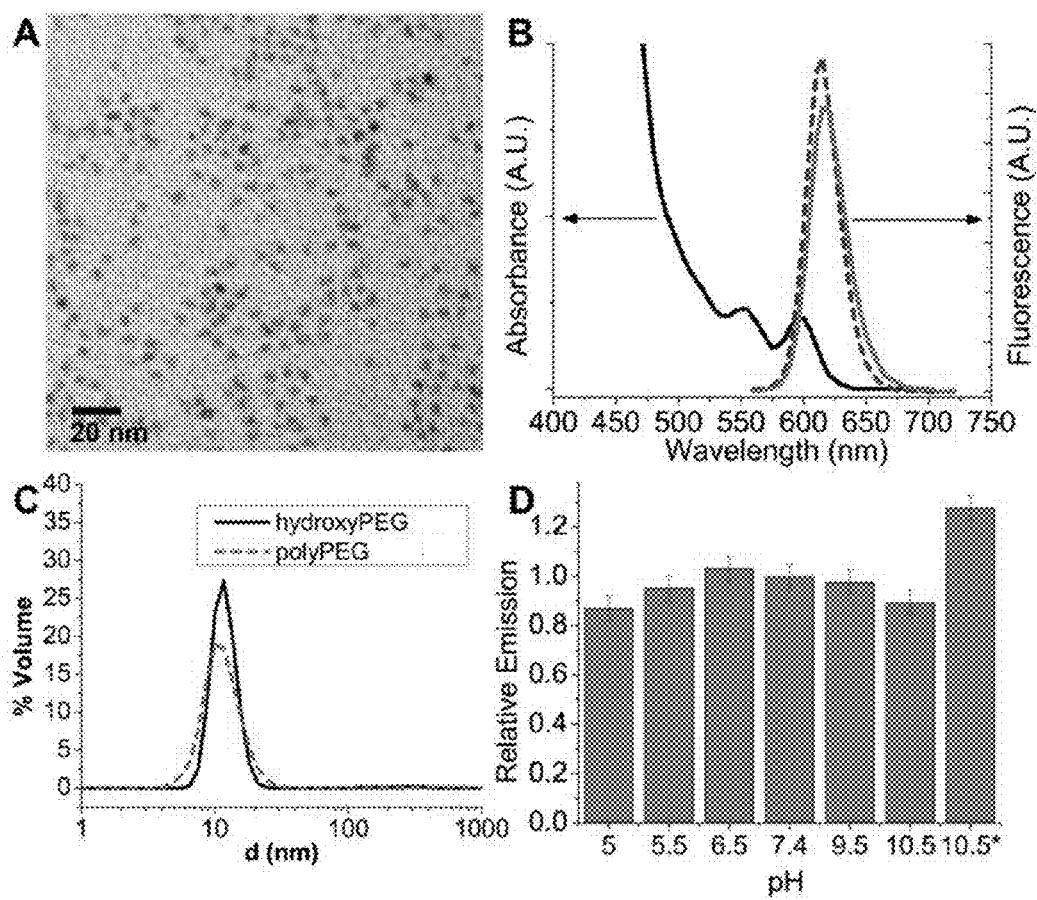
FIG. 8A is a TEM image of nanocrystals ligand exchanged with polyPEG, showing non-aggregated mono-disperse samples.
FIG. 8B shows absorption spectra (solid line, black, left axis) and emission spectra of nanocrystals before ligand exchange in octane (dashed line, blue, right axis), and after ligand exchange in PBS (solid line, red, right axis), showing a slight decrease in fluorescence intensity with a final QY in water of >60%.
FIG. 8C shows dynamic light scattering measurement of nanocrystals ligand exchanged with hydroxyPEG (solid line, black) and nanocrystals ligand exchanged with polyPEG (dashed line, red).
FIG. 8D depicts stability of polyPEG nanocrystals in various pH buffers after incubation at RT for 4 h. pH 10.5* refers to emission intensity after 5 minutes irradiation under 365 nm UV light, showing ~20% photobrightening.

TEM analysis of nanocrystals from water after ligand exchange with poly(PEG) shows that the nanocrystals were well dispersed (FIG. 8A), and dynamic light scattering analysis showed a single monodisperse population centered at ~11.5 nm hydrodynamic diameter for 605 nm emitting CdSe (ZnCdS) nanocrystals (FIG. 8C). This size was comparable to that of the same nanocrystals ligand exchanged with hydroxyPEG (FIG. 8C), possibly due to the compact nature of the imidazole binding group, which is only a few carbons away from the polymer back-bone. In addition, the multi-dentate binding motif employed in poly(PEG) resulted in an aqueous solution that was far more stable than hydroxyPEG nanocrystals under similar conditions. For instance, dilute hydroxyPEG nanocrystals and polyPEG nanocrystals (<100 nM) were stored at room temperature under ambient room lighting. Both samples had previously been dialyzed to remove excess ligand from the solution. Within 15 hours, the hydroxyPEG nanocrystals precipitated from the solution, presumably due to photo-oxidation of the dithiol group. The polyPEG coated nanocrystals, on the other hand, remained stable under ambient conditions for at least 2 months. Such aqueous nanocrystals often serve as a scaffold for further modification by conjugation with dyes or proteins in order to make them functional for cellular targeting and imaging/sensing experiments. Having a stable aqueous nanocrystal construct can make these experiments vastly more convenient, since the nanocrystal preparations can be made and stored, rather than being prepared immediately prior to use.

In addition to solution stability and retention of surface passivation, the emission of poly(PEG) nanocrystals remained stable in buffers ranging from pH 5 to pH 10.5 after incubation at room temperature for 4 h (FIG. 8D). Previous studies on the pH dependence of His-tag binding to Ni-NTA media show that the interaction was stable between pH 7-11,[22, 31] and became disrupted below pH 5 due to the protonation of the imidazole group. These results were consistent with the binding of poly(PEG) to the surface of nanocrystals via metal-affinity interactions. Below pH 5, the fluorescence intensity of nanocrystals dropped rapidly, but the nanocrystals remained well dispersed in solution without any visible formation of macroscopic aggregation. A photobrightening effect was observed with poly(PEG) nanocrystals. Illumination with 365 nm UV for 5 minutes increased the fluorescence intensity of poly(PEG) nanocrystals by as much as 30%. This increase in fluorescence was retained for at least 24 h after the photo-annealing treatment. Previous studies showed nanocrystal photo-brightening upon conjugation with His$_6$-tagged proteins,[32] and the polymer in this case was likewise bound to the nanocrystal surface via an imidazole moiety.

Example 4

Three-Component Random Copolymers for Functionalized Biocompatible Nanocrystals

Multi-functional polymers were synthesized from monomers 4, 6, and one of monomers 8, 9, or 11, resulting in functionalized nanocrystals with a primary amine or a biotin group upon water solubilization. Co-polymerization with three monomers proceeded smoothly, with good size control and low polydispersity, and functional monomers were incorporated at molar feed ratios ranging from 10-25%. As mentioned previously, the incorporation of all monomers was maximized by running the polymerization to near 100% conversion, as overlapping $^1$H signals made it difficult to determine the final polymer composition by NMR. Using the short aminoPeg$_3$ monomer 8, polymers with amine functionalities were synthesized (i.e. poly(aminoPEG$_3$)) with the functional group close to the surface of the nanocrystal after ligand exchange. This system was well suited to dye conjugation and FRET sensing applications, as detailed below. Using the aminoPEG$_{11}$ monomer 9, polymers with longer amine functionalities were synthesized (i.e., poly(aminoPEG$_{11}$)), which were more suitable for the conjugation of nanocrystals to large biomolecules such as proteins or antibodies. The longer $PEG_{11}$ linker made the terminal amino groups more sterically accessible. Using the monomer 11, polymers bearing a biotin functionality were also synthesized, giving water soluble nanocrystals that bound readily to streptavidin coated plates.

Example 5

Conjugation to a Dye for FRET Sensing Applications

Nanocrystals ligand exchanged with poly(aminoPEG$_3$)$_{10\%}$ were conjugated with 5-carboxy-X-rhodamine (ROX), a red-emitting fluorescent dye, to form amide-linked conjugates. The dye absorbance offered a convenient indication of the coupling yield. Additionally, non-radiative energy transfer from the nanocrystal to appended dyes can be interpreted within the Förster model to determine the typical radial distance from the nanocrystal to derviatization sites, and serves to evaluate the suitability of these nanocrystal for imaging and sensing strategies based on nanocrystal-dye FRET pairs.[33, 34]

Figure 9:
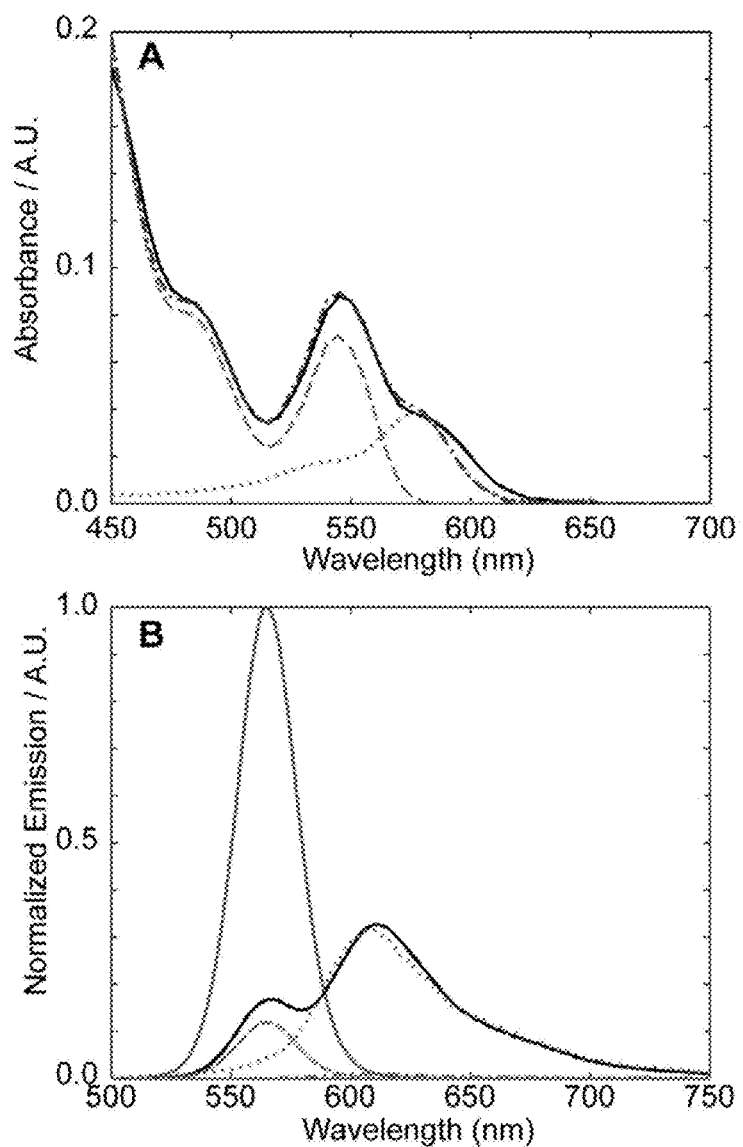
FIG. 9A is a graph depicting the absorption spectrum of purified nanocrystals ligand exchanged with poly(aminoPEG3)10% conjugated with ROX dye molecules (solid line, black), least-squares fit of conjugate spectrum (dash-dotted line, blue), as sum of nanocrystal (dotted line, green) and free ROX (dotted line, red) contributions.
FIG. 9B is a graph depicting the photoluminescence spectrum of conjugate (solid line, black) and of control nanocrystals (solid line, green) and free dye (dash-dotted line, red), normalized to reflect the nanocrystal and ROX concentrations, respectively, present in the conjugate sample. Contributions of nanocrystal (dashed line, green) and free ROX (dotted line, red) to conjugate emission spectrum as obtained from a least-squares fit are also shown. All samples were excited at 450 nm, with dye emission in the conjugate >30 fold enhanced as compared to the free dye.

To form conjugates, an aliquot of the amine-reactive succinimidyl ester of 5-ROX (either obtained commercially, or prepared from the 5-ROX free acid and N-hydroxysuccinimide with dicyclohexylcarbodiimide) in dimethyformamide was added to a solution of the nanocrystals in phosphate buffer at pH 7.6. Following the coupling reaction, the nanocrystals were separated from unbound dye and NHS byproduct via size exclusion chromatography. The absorption (FIG. 9A) and emission (FIG. 9B) spectra of a purified nanocrystal-ROX conjugate were made using 562 nm-emitting nanocrystals and 27 equivalents of the activated dye. The dye contribution to the sample absorbance was clearly visible in FIG. 9A as a shoulder on the red side of the lowest exciton peak. A fit of the spectrum as a sum of nanocrystal and dye components revealed an average dye:nanocrystal ratio of 1.78:1. FIG. 9B shows the PL spectrum of the conjugate under 450 nm excitation. This excitation wavelength was chosen because at 450 nm, the ROX dye has minimal absorbance, such that the nanocrystal was selectively excited. The nanocrystal PL peak was significantly quenched versus that of a control sample that was processed similarly but not modified with the ROX dye. The ROX emission centered at 610 nm was significantly enhanced versus that of the free dye, when normalized for the sample concentrations. These observations were consistent with energy transfer: a fit of the emission spectrum revealed an energy transfer efficiency of 88%.

The high energy transfer efficiency suggested that the copolymer ligand system was able to position small-molecule substituents in close proximity to the nanocrystal surface. Analysis of the observed efficiency and spectral overlap according to the Förster model suggested a characteristic separation distance of no more than 4.5 nm, consistent with the measured small hydrodynamic radius for the ligand-exchanged nanocrystals. The limited coupling yield observed here may indicate saturation of the available primary amine binding sites—suggesting that not all amine side-chains on the polymeric ligand are sufficiently accessible from the solvent. Increasing the aminoPEG$_3$ monomer feed ratio from 10% to 25% mole fraction increased the amount of dye that could be conjugated to ~4 per nanocrystal using a similar initial dye:nanocrystal mix ratio. Taken together, these results show that the incorporation of aminoPEG$_3$ into the polymer as a functional site for derivitaziation proved to be successful. These initial results bode well for the derivatization of these nanocrystals with dyes and other small molecules for applications in targeted biological imaging and sensing.

Example 6

Nonspecific Binding to HeLa Cells

Figure 10:
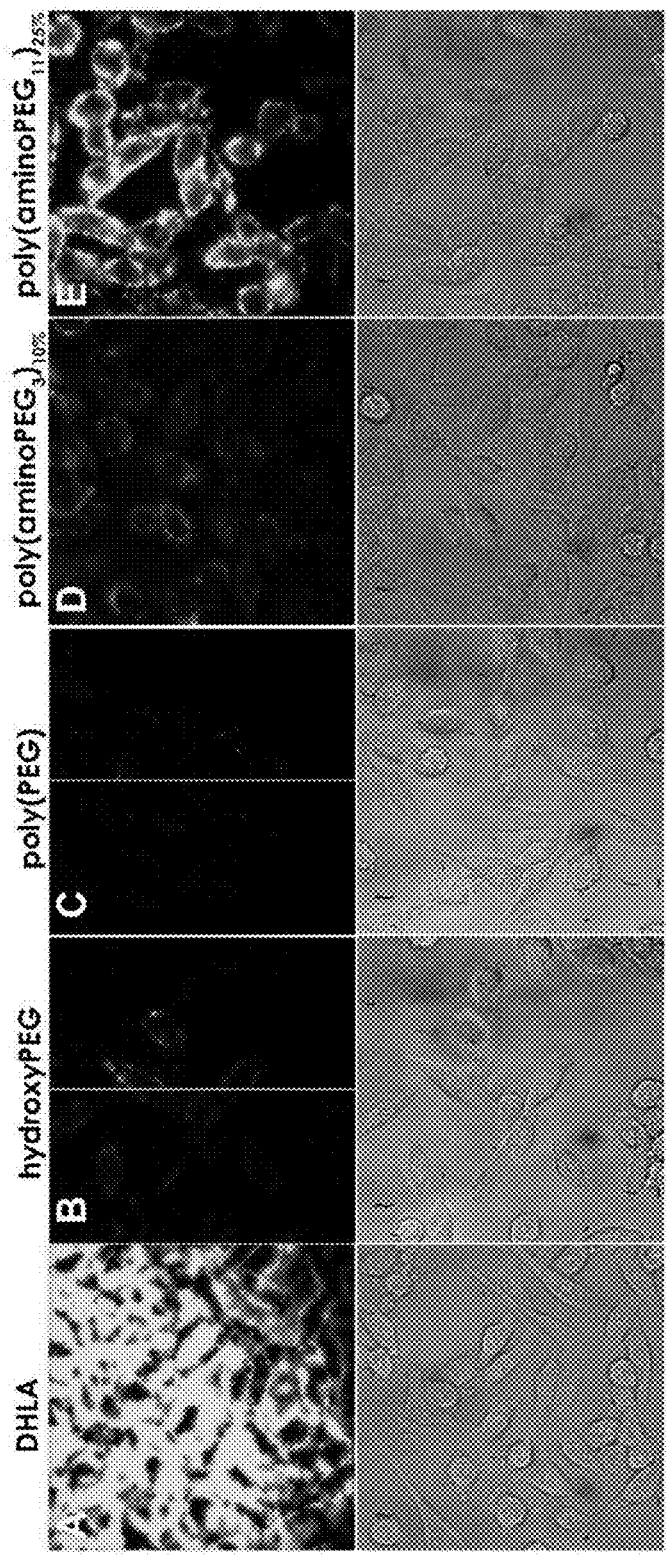
FIGS. 10A-10E are photomicrographs illustrating non-specific binding of nanocrystals on HeLa cells as a function of ligand coating, with incubation at 500 nM nanocrystal concentration for 5 min at 4° C., followed by 4× wash with PBS buffer before imaging. Top panels: nanocrystal fluorescence at 565 nm with excitation at 488 nm. All images are scaled to the same contrast with the exception of FIGS. 10B and 10C, for which the left section has the same contrast as the other images, while the contrast has been boosted in the right section to highlight the difference between FIGS. 10B and 10C. Bottom panels: corresponding DIC image. Nanocrystals were ligand exchanged with DHLA (FIG. 10A), hydroxyPEG (FIG. 10B), poly(PEG) (FIG. 10C), poly(aminoPEG$_3$)$_{10\%}$ (FIG. 10D), and poly(aminoPEG$_{11}$)$_{25\%}$ (FIG. 10E).

To test the non-specific binding of poly(PEG) based nanocrystals, HeLa cells were incubated with nanocrystals of various surface compositions. See FIGS. 10A-10E. Since the level of non-specific binding was inherently low for such PEGylated nanocrystals, the cells were incubated at high nanocrystal concentrations (~500 nM) to highlight the differences between different ligand compositions. As expected, DHLA coated nanocrystals produced a high degree of non-specific binding to both cells and glass.[21] HydroxyPEG coated nanocrystals exhibited minimal non-specific binding, but some nanocrystal stickiness could be observed with enhanced contrast of the fluorescence images. Poly(PEG) nanocrystals, when viewed under the same enhanced contrast showed virtually no non-specific binding, which may be attributed to several factors. First, the PEG chains of poly (PEG) are terminated in methoxy groups, which can further reduce non-specific binding versus PEG terminated with hydroxyl groups.[26, 35] Second, the PEG length of poly(PEG) is slightly longer versus that of hydroxyPEG, and third, the methoxyPEG along the polymer backbone may offer a denser coverage of PEG groups to better passivate the nanocrystal surface. When amine groups were introduced in a three-component polymer as in FIGS. 10D and 10E, increasing levels of non-specific binding were observed. Poly(aminoPEG$_3$)$_{10\%}$ showed slightly more non-specific binding versus hydroxyPEG nanocrystals, and poly(aminoPEG$_{11}$)$_{25\%}$ exhibited even more non-specific binding. Although the non-specific binding for poly(aminoPEG$_{11}$)$_{25\%}$ appeared to be non-trivial, the incubation for this particular experiment was performed at high nanocrystal concentration (500 nM). Covalent conjugation of streptavidin to poly(aminoPEG$_{11}$)$_{25\%}$ nanocrystals and their subsequent targeting to cells at low nanocrystal concentrations resulted in labeling with good signal to noise and allowed for single molecule tracking of nanocrystals with minimal background.

Example 7

Conjugation to Streptavidin for Specific Targeting

Figure 11:
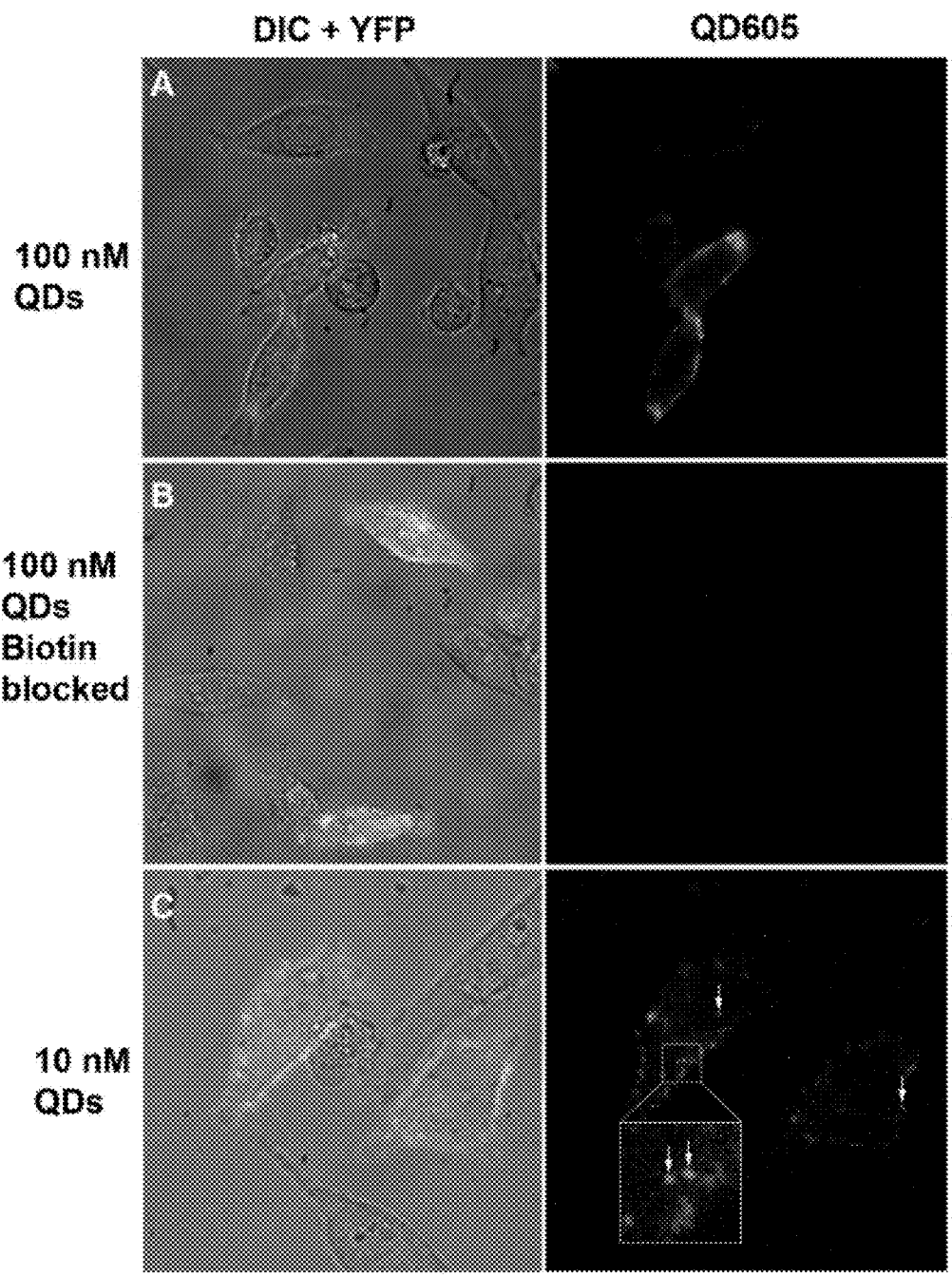
FIGS. 11A-11C are photomicrographs depicting targeting of poly(aminoPEG$_{11}$)$_{25\%}$ nanocrystal-SA conjugates to live HeLa cells transfected with AP-YFP-TM.

Poly(aminoPEG$_{11}$)$_{25\%}$ nanocrystals were conjugated to streptavidin (SA) via EDC coupling chemistry. For targeting, HeLa cells were transfected with a plasmid containing yellow fluorescent protein (YFP) fused to an acceptor peptide (AP) tag[13] and a transmembrane domain (TM) at the termini (AP-YFP-TM). The AP tag was specifically biotinylated by endogenously expressed BirA and displayed on the cell surface along with YFP via the TM domain. The nanocrystal-SA conjugates were then added for labeling. At high a nanocrystal labeling concentration of 100 nM, excellent co-localization was observed between the YFP and nanocrystal channels, with very low levels of non-specific binding to non-transfected cells and glass (FIG. 11A). A control experiment in which the nanocrystal-SA construct was pre-incubated with biotin showed no binding, confirming that the binding interaction was indeed between the nanocrystal-SA and biotin on the cell surface (FIG. 11B). By reducing the nanocrystal labeling concentration to 10 nM, single nanocrystals could be readily observed, as identified by their fluorescence intermittency behavior (i.e., blinking) (FIG. 11C). Furthermore, conjugation of SA to poly(aminoPEG$_3$)$_{25\%}$ nanocrystals under the same conditions showed much weaker cell labeling, likely due to the unfavorable sterics of accessing the amine group at the end of the much shorter PEG$_3$ linker, demonstrating the versatility of using a three-component co-polymer system to tailor both the surface functionality and accessibility of chemical groups on the nanocrystal surface for the desired application. As previously discussed, DHLA-PEG based nanocrystals are subject to degradation via loss of ligand coating after approximately one week and have increasing non-specific binding to cells. By contrast, poly(PEG) based nanocrystals remain non-sticky and functional on the timescale of months.

Example 8

Non-Specific Binding in Serum Proteins for In-Vivo Applications

Figure 12:
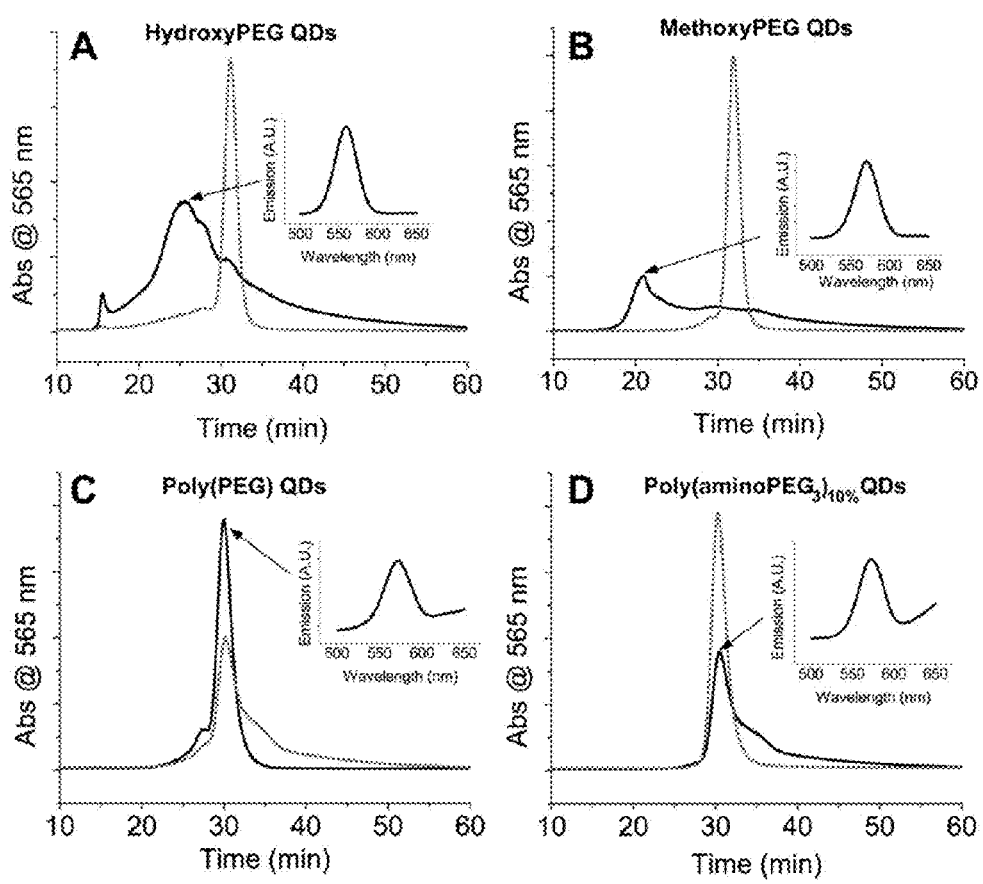
FIGS. 12A-12D are graphs depicting fluorescence detected size exclusion chromatography to probe non-specific binding of nanocrystals with serum proteins after incubation with 95% mouse bovine serum for 4 h at 37° C. Nanocrystals before incubation (dashed line, red) and after incubation (solid line, black) for (FIG. 12A) hydroxyPEG nanocrystals, (FIG. 12B) methoxyPEG nanocrystals, (FIG. 12C) poly(PEG) nanocrystals, and (FIG. 12D) poly(aminoPEG$_3$)$_{10\%}$ nanocrystals.

The PEG$_{11}$ monomer 6 was included in a significant mole fraction within the polymer not only to provide water solubility, but also to mitigate nonspecific binding and prevent biofouling of nanocrystals. To illustrate the stability of these nanocrystals for in-vivo applications, various polymer-coated CdSe(CdZnS) 565 nm emitting nanocrystals were incubated with mouse bovine serum at 37° C. for 4 hours. These samples were then analyzed by size exclusion chromatography with fluorescence detection to determine the extent of non-specific binding to serum protein. In the case of nanocrystals coated with hydroxyPEG, significant serum protein binding was observed, as indicated by the formation of a large broad peak eluting at earlier times after serum incubation versus control (FIG. 12A). Previous serum binding experiments using hydroxyPEG on InAs(ZnSe) nanocrystals revealed low levels of non-specific binding to serum protein. The discrepancy is likely due to the relative size of the nanocrystal cores. In the InAs(ZnSe) case, the inorganic cores were on the order of 2 nm in diameter, and the PEG$_8$ group of hydroxyPEG provided sufficient passivation against non-specific binding. The CdSe(CdZnS) nanocrystals used in this study were approximately twice the diameter, and the relatively short PEG$_8$ chains of hydroxyPEG were likely less able to provide full surface passivation. Even in the case of methoxyPEG, which features a longer PEG$_{11}$ chain, significant serum binding was observed after incubation (FIG. 12B). By contrast, poly(PEG) nanocrystals, bearing what was essentially a polymer form of methoxyPEG, exhibited negligible non-specific binding to serum proteins after incubation (FIG. 12C, indicated by the appearance of the peak position at the same position as the control). The PEG units along the polymer back-bone provided denser coverage of PEG on the surface of the nanocrystals, thus giving it enhanced anti-biofouling properties. Functionalized nanocrystals bearing 10% aminoPEG$_3$ functionality also exhibited no detectable non-specific binding in serum (FIG. 12D).

Example 9

Figure 13:
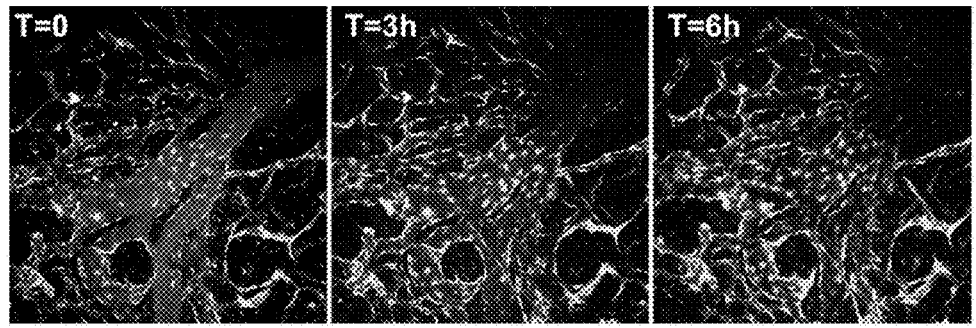
FIG. 13 is a time series of photomicrographs of nanocrystal imaging of P0008 tumor vasculature in Tie2-GFP/FVB mice. Red fluorescence corresponded to the signal from nanocrystals within the vessel lumen, while the green fluorescence was from the GFP co-expressed with the Tie2 molecules on the surface of endothelial cells that line the vessel wall. The nanocrystals were initially confined within the vessels at T=0, followed by clearance and extravasation into the tumor tissue (T=3 h and T=6 h, respectively).

Probing the Tumor Vasculature using polyPEG Nanocrystals as a Diffusion Tracer The distribution dynamics of these nanocrystals in the tumor vasculature of live mice was studied. Using a carcinoma tumor model grown in transparent windows in mice, vascular transport of nanocrystals after intravenous injection was imaged via two-photo laser scanning microscopy as a function of time to observe the nanocrystal distribution kinetics (FIG. 13). The mouse vessel walls were visualized independently via GFP co-expressed with Tie2 molecules on the surface of endothelial cells that line the vessel wall.[36] 605 nm emitting CdSe(CdS) poly(PEG) nanocrystals were injected retro-orbitally, and the tumor vasculature was imaged over 6 h. Initially, the nanocrystals were confined to the vessel walls. After 3 h, they began to clear, and after 6 h, the nanocrystals had extravasated from the tumor tissue, appearing as a uniform signal spread throughout the field of view. The nanocrystals appeared stable, and there was no indication of stickiness or aggregation in the tissues.

Example 10

Figure 14:
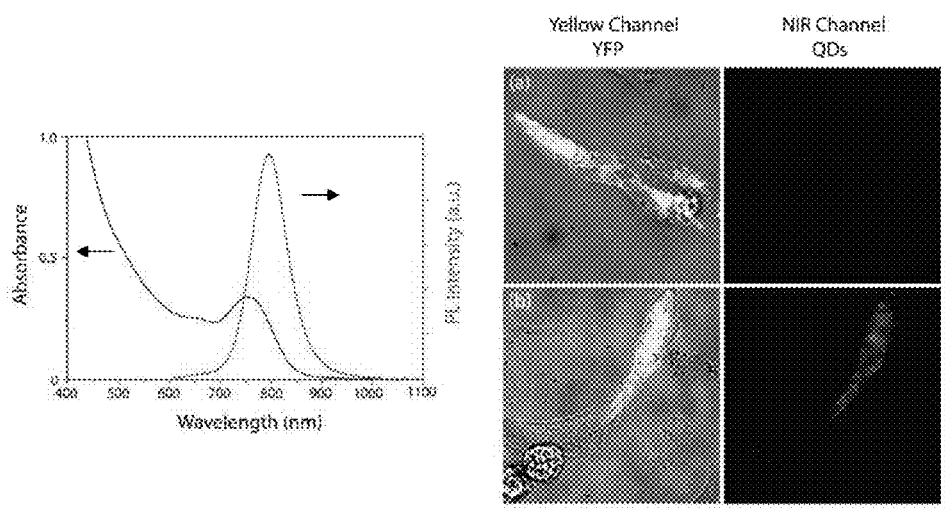
FIG. 14 illustrates properties of InAs(CdZnS) nanocrystals dispersed in water using poly(PEG). Left panel, absorption (black) and emission (red) spectra of InAs(CdZnS) nanocrystals after ligand exchange with poly(PEG). Right panel, targeting of streptavidin conjugated InAs nanocrystals water solubilized with poly(aminoPEG$_{11}$)$_{10\%}$ to cells expressing biotinylated YFP.

Water Solubilization using InAs(ZnCdS) and $\gamma$-Fe$_2$O$_3$ Nanocrystals To demonstrate the versatility of poly(PEG) for aqueous phase transfer of a different type of nanocrystal, the same ligand exchange procedure was carried out using poly(PEG) on InAs(CdZnS) nanocrystals emitting in the NIR at ~800 nm (FIG. 14, left). These nanocrystals behaved well in water, showing a hydrodynamic diameter <10 nm by GFC analysis. Amine functionalized aqueous InAs nanocrystal were realized by ligand exchanging with poly(aminoPEG$_{11}$)$_{10\%}$, and streptavidin was successfully conjugated to these nanocrystals for cellular targeting (FIG. 14, right).

Figure 15:
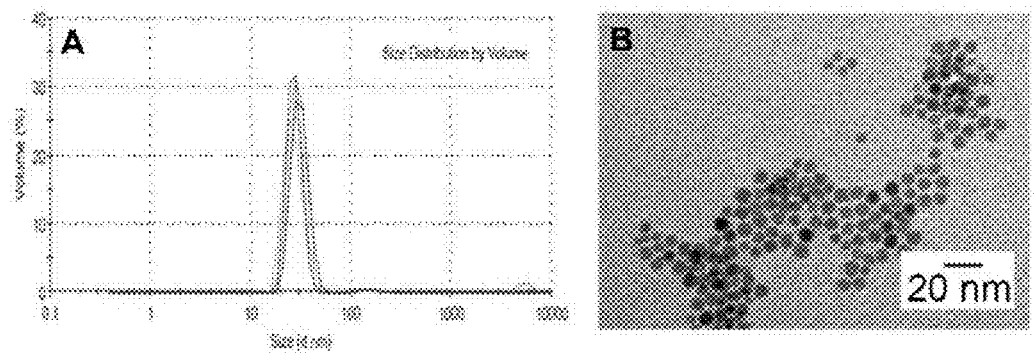
FIGS. 15A-15B illustrate amine-functionalized $\gamma$-Fe$_2$O$_3$ nanocrystals in water using a polymer prepared from 20 mol % catechol 14, 60 mol % PEG$_{22}$ 15, and 20 mol % aminoPEG$_3$ 8.

Iron oxide nanocrystals were water-solubilized using a catechol binding group rather than an imidazole binding group. Monomer 14 (FIG. 4) was used in the polymerization reaction in place of monomer 4. Since iron oxide cores were larger compared with CdSe cores, a monomer with a longer PEG chain was synthesized (compound 15, FIG. 4) to facilitate water solublization. The amine functionalized iron oxide nanoparticles had a diameter of ~25 nm by dynamic light scattering (FIG. 15A), and a TEM image of the aqueous nanocrystals show a well dispersed sample with no signs of aggregation (FIG. 15B).

Example 11

Materials and Analysis

All chemicals unless indicated were obtained from Sigma Aldrich and used as received. Air sensitive materials were handled in an Omni-Lab VAC glove box under dry nitrogen atmosphere with oxygen levels <0.2 ppm. All solvents were spectrophotometric grade and purchased from EMD Biosciences. Amine-bearing compounds were visualized on thin layer chromatography (TLC) plates using a ninhydrin solution. Acrylate compounds bearing terminal vinyl groups were visualized on TLC using KMnO$_4$. All other TLC plates were visualized by iodine staining. Flash column chromatography was performed on a Teledyne Isco CombiFlash Companion. NMR spectra were recorded on a Bruker DRX 401 NMR Spectrometer. UV-Vis absorbance spectra were taken using an HP 8453 diode array spectrophotometer. Photoluminescence spectra were recorded with a BioTek Synergy 4 Microplate Reader. Dynamic light scattering analysis was performed on a Malvern Instruments ZetaSizer ZS90 in a low volume 12 µL quartz cuvette, with nanocrystal concentrations between 1-3 µM. At least three measurements were made per sample and averaged.

Example 12

Compound 1

To a solution of methoxy poly(ethylene glycol) (average MW 550 g/mol) (5.0 g, 9.09 mmol) in DCM was added dicyclohexylcarbodiimide (DCC) (2.25 g, 10.91 mmol), 4-dimethylamino-pyridine (DMAP) (0.22 g, 1.82 mmol) and lipoic acid (2.46 g, 10.91 mmol). The solution was stirred at room temperature overnight, and the precipitates were removed by vacuum filtration. The solvent was removed in vacuo, and ethyl acetate (50 mL) was added to further induce precipitation of by-products. The solution was filtered once more, the solvent removed in vacuo, and the crude product was purified by silica column (ethylacetate/methanol 96:4) to yield the intermediate lipoic acid functionalized methoxyPEG as a yellow oil (4.85 g, 70% yield). The product was dissolved in a mixture of ethanol/water 1:4, to which sodium borohydride was added.

Example 13

Compound 2

To a stirred solution of acrylic acid (1 g, 13.88 mmol) and N-hydroxysuccinimide (NHS) (1.91 g, 16.65 mmol) in 40 mL of dry THF was added dropwise a solution of dicyclohexylcarbodiimide (DCC) (3.43 g, 16.65 mmol) in 10 mL dry THF with stiffing at 4° C. The solution was warmed to room temperature and stirred for 2 hours. Precipitates were removed by filtration, and the solvent was evaporated. Ethylacetate (50 mL) was added to facilitate further precipitation of reaction byproducts, and filtered once more. The solvent was evaporated and the product dissolved in 10 mL anhydrous DMF to create a stock solution, which was used in later reaction steps without further purification.

Example 14

Compound 4 (Imidazole-Monomer

To an aqueous solution of sodium bicarbonate (50 mL, 0.3 M) was added DMF (50 mL) and histamine dihydrochloride (2.50 g, 13.59 mmol). To this solution was added compound 2 (2.75 g, 16.3 mmol) in a solution of DMF, with stiffing at 4° C. The reaction was monitored via TLC by ninhydrin stain for primary amines, and confirmed to be complete after 30 min to give the crude compound 3. The solvent was removed in vacuo, and the product re-dissolved in DMF (50 mL). The solution was filtered, and triethylamine was introduced (2.27 mL, 16.30 mmol). BOC$_2$O was added dropwise at 4° C., and the solution was stirred overnight at RT. Water was added and the solution extracted with CHCl$_3$ (3×25 mL). The organics were combined and dried over sodium sulfate, and the solvent removed in vacuo. The crude product was purified by silica column (ethyl acetate/hexanes gradient 50:50 to 100:0, v/v) to give the pure product as a clear oil (2.59 g, 72% yield). $^1$H NMR (400 MHz, CDCl$_3$): δ (ppm) 1.54 (s, 9H), 2.72 (t, 2H), 3.53 (dt, 2H), 5.53 (dd, J$_1$=1.8 Hz, J$_2$=10.0 Hz, 1H,), 6.07 (dd, J1=9.8 Hz, J2=17.0 Hz, 1H), 6.19 (dd, J1=1.8 Hz, J2=17.0 Hz, 1H), 7.10 (s, 1H), 7.95 (s, 1H).

Example 15

Compound 5

Neat methoxy poly(ethylene glycol) (10 g, 18.18 mmol, average MW 550 g/mol) was degassed at 80° C. for 1 h with stirring to remove traces of water. The flask was back-filled with N$_2$ and cooled on an ice bath before thionyl chloride (1.98 mL, 27.27 mmol) was slowly added. The solution was warmed to 25° C. and stirred for 2 h. The conversion was monitored by the disappearance of the broad O—H stretch at 3,500 cm$^{-1}$ and the appearance of a C—Cl stretch at 730 cm$^{-1}$ in the IR spectrum. The product was diluted with DMF (20 mL) and the solvent removed under reduced pressure. This was repeated three times to remove all residual traces of thionyl chloride. The sample was dissolved in a solution of sodium azide (1.77 g, 27.27 mmol) in 100 mL DMF and stirred overnight at 85° C. The solvent was removed under reduced pressure and 200 mL of dichloromethane was added. The precipitate was removed by vacuum filtration and the solvent evaporated in vacuo to yield the intermediate monoazide. The sample was dissolved in 150 mL of tetrahydrofuran (THF), and triphenylphosphine (7.15 g, 27.27 mmol) was added. The solution was stirred at 25° C. for 4 h before adding 1 mL of water and stirring overnight. The THF was removed in vacuo and 100 mL of water was added. The precipitate was removed by vacuum filtration and the filtrate washed with toluene (3×50 mL). The water was removed in vacuo to yield the pure product as light yellow oil (9.67 g, 95%).

Example 16

Compound 6 (PEG Monomer

To an aqueous solution of sodium bicarbonate (100 mL, 0.3 M) was added DMF (100 mL) and compound 5 (2.20 g, 3.94 mmol). To this solution was added compound 2 (1.00 g, 5.92 mmol) in a solution of DMF, with stiffing at 4° C. The reaction was monitored via TLC by ninhydrin stain for primary amines, and confirmed to be complete after 30 min. Water was added and the solution extracted with CHCl$_3$ (3×25 mL). The organics were combined and dried over sodium sulfate, and the solvent removed in vacuo. The crude product was purified by silica column (methanol/ethyl acetate gradient 0:100 to 5:95, v/v) to give the pure product as a pale yellow oil (1.88 g, 78% yield).

Example 17

Compound 8 (aminoPEG$_3$ Monomer

To a solution of 4,7,10-trioxa-1,13-tridecanediamine (10.00 g, 45.45 mmol) in DCM (25 mL) was added dropwise BOC$_2$O (1.98 g, 9.09 mmol) at 4° C. The solution was allowed to warm to room temperature and stirred overnight. The solution was washed with water (3×20 mL) to remove unreacted starting material. TLC analysis with ninhydrin staining shows mostly mono-substituted product in the organic phase. The organics were dried over sodium sulfate and solvent removed in vacuo. The crude product was dissolved in a mixture of aqueous sodium bicarbonate buffer (20 mL, 0.3 M), and DMF (20 mL), to which compound 1 (1.77 g, 9.09 mmol) was added dropwise in a solution of DMF with stiffing at 4° C. The reaction was monitored via TLC by ninhydrin stain for primary amines, and confirmed to be complete after 30 min. Water was added and the solution extracted with CHCl$_3$ (3×25 mL). The organics were combined and dried over sodium sulfate, and the solvent removed in vacuo. The crude product was purified by silica column (ethyl acetate/methanol gradient 100:0 to 95:5, v/v) to give the pure product as a clear oil.

Example 18

Compound 9 (aminoPEG$_{11}$ Monomer

To a solution of O-(2-Aminoethyl)-O'-[2-(Boc-amino)ethyl]decaethylene glycol (0.50 g, 0.78 mmol) in DMF (15 mL) was added triethylamine (0.086 g, 0.85 mmol) and compound 1 (0.20 g, 1.16 mmol) dropwise in a solution of DMF with stirring at 4° C. The reaction was monitored via TLC by ninhydrin stain for primary amines, and confirmed to be complete after 30 min. The solvent was removed in vacuo, and the crude product was purified by silica column (hexanes/ethyl acetate gradient 20:80 to 0:100, v/v) to give the pure product as a clear oil. $^1$H NMR (400 MHz, CDCl$_3$): δ (ppm) 1.42 (s, 9H), 3.30 (q, 2H), 3.50-3.70 (m, 46H), 5.59 (dd, J$_1$=2.0 Hz, J$_2$=9.8 Hz, 1H,), 6.16 (dd, J$_1$=9.8 Hz, J$_2$=17.0 Hz, 1H), 6.28 (dd, J$_1$=2.0 Hz, J$_2$=17.0 Hz, 1H).

Example 19

Compound 10

$^1$H NMR (400 MHz, CDCl$_3$): δ (ppm) 1.37 (s, 9H), 1.40-1.32 (m, 2H), 1.60 (m, 4H), 2.16 (t, J=7.5 Hz, 2H), 2.68 (d, J=12.8 Hz, 1H), 2.82 (dd, J$_1$=12.8 Hz, J$_2$=4.9 Hz, 1H), 3.06 (m, 1H), 3.24 (m, 2H), 3.35 (m, 2H), 3.48 (m, 4H), 3.52-3.61 (m, 40H), 4.23 (m, 1H), 4.43 (m, 1H).

Example 20

Compound 11 (Biotin-Monomer

To compound 10 (500 mg) was added 4M HCl in dioxane, and stirred for 1 hr at room temperature. The solvent was removed in vacuo, and the crude product dissolved into a solution of 0.25 M aqueous sodium bicarbonate with DMF. To this solution was added dropwise a solution of compound 2. The reaction was monitored via TLC by ninhydrin stain for primary amines and confirmed to be complete after 30 min. The solvent was removed in vacuo, and the crude product was purified by silica column chromatography. $^1$H NMR (400 MHz, CDCl$_3$): δ (ppm) 1.43 (m, 2H), 1.66 (m, 4H), 2.22 (t, J=7.4 Hz, 2H), 2.74 (d, J=12.8 Hz, 1H), 2.89 (dd, J$_1$=12.8 Hz, J$_2$=4.9 Hz, 1H), 3.13 (m, 1H), 3.42 (m, 2H), 3.48-3.72 (m, 44H), 4.30 (m, 1H), 4.49 (m, 1H), 5.61 (dd, J$_1$=2.0 Hz, J$_2$=9.8 Hz, 1H,), 6.17 (dd, J$_1$=9.8 Hz, J$_2$=17.0 Hz, 1H), 6.28 (dd, J$_1$=2.0 Hz, J$_2$=17.0 Hz, 1H).

Example 21

Poly(PEG) Polymerization

All monomers were kept as dilute stock solutions between 30-100 mg/mL in either ethylacetate or methanol. Stock solutions of RAFT agent 12 were prepared at 220 mg/mL in DMF, and AIBN was prepared at 50 mg/mL in DMF. All reagents were weighed out volumetrically. In a typical polymerization, monomers 4 (33 mg, 0.13 mmol) and 6 (77 mg, 0.13 mmol) were added to an 8 mL vial. The solvent was removed in vacuo and 50 µL of dry DMF along with RAFT agent 12 (2.53 mg, 0.0088 mmol), and AIBN (1.43 mg, 0.0088 mmol) were added. The contents of the vial were mixed, centrifuged at 5000 g for 2 min, and then transferred to a 1 mL ampoule. The ampoule was subjected to 4 cycles of freeze-pump-thaw, and sealed under vacuum using a butane torch. The vial was heated to 70° C. on an oil bath for 1.5-3 h, after which 0.5 mL of a 4M HCl in dioxane solution was added to cleave the BOC protecting groups. After 1 h at room temperature, the HCl was removed in vacuo. The deprotected polymer was dissolved in MeOH, to which a solution of NaOH in MeOH (1M) was added dropwise to adjust the pH to be between 8-9. The solvent was removed in vacuo, and then CHCl$_3$ was added to precipitate the salts. The solution was filtered through a 0.45 µm PTFE filter and the solvent removed in vacuo to yield the final polymer for ligand exchange.

Example 22

Nanocrystal Synthesis

CdSe cores were synthesized according to previously reported procedures,[19, 37, 38] and were overcoated with either Zn$_{0.8}$Cd$_{0.2}$S alloy shells or pure CdS shells. The alloy shell overcoating procedure has been described previously,[19, 38] and was used here to obtain nanocrystals emitting at 565 and 605 nm with QYs of ~80% when diluted in hexane. For pure CdS shells, a successive ion layer adsorption and reaction (SILAR) procedure modified from those reported by Peng et al. and Mews et al. (Xie JACS) was used.[29, 30] Briefly, CdSe cores with a first exciton feature at 491 nm were synthesized by heating a mixture of trioctylphosphine (TOP), trioctylphosphine oxide (TOPO), CdO (0.9 mmol), and tetradecylphosphonic acid (TDPA, 2.0 mmol) to 340° C. under nitrogen, removing evolved water in vacuo at 160° C., re-heating to 360° C. under nitrogen, and rapidly introducing trioctylphosphine selenide (TOPSe, 3.4 mmol) in trioctylphosphine (TOP), followed by cooling to room temperature. Cores isolated by repeated precipitations from hexane with acetone were brought to 180° C. in a solvent mixture of oleylamine (3 mL) and octadecene (6 mL). Aliquots of Cd and S precursor solutions were then introduced alternately starting with the metal (Cd), waiting 15 min between the start of each addition. The Cd precursor consisted of 0.6 mmol Cd-oleate and 1.2 mmol decylamine in a solvent mixture of octadecene (3 mL) and TOP (3 mL). The S precursor consisted of 0.6 mmol hexamethyldisilathiane [(TMS)$_2$S] in 6 mL TOP. The dose of each overcoating precursor aliquot was calculated to provide a single monolayer of ions to the nanocrystal surface. Addition of a total of 4 aliquots each of Cd and S yielded nanocrystals with emission at 562 nm and a QY close to unity when diluted in hexane. A similar procedure was performed on larger CdSe cores to obtain CdSe(CdS) nanocrystals emitting at 610 nm.

Example 23

Ligand Exchange with poly(PEG)

Nanocrystals (2 nmol) were precipitated 1× using MeOH and brought into 50 uL of CHCl$_3$. The nanocrystal stock solution was added to a solution of poly(PEG) (5 mg) in CHCl$_3$ (30 uL), and stirred for 10 min at RT, after which 30 µL of MeOH was added followed by stiffing for an additional 40 min. Nanocrystal samples were precipitated by the addition of EtOH (30 µL), CHCl$_3$ (30 µL), and excess hexanes. The sample was centrifuged at 4000 g for 2 min, the supernatant discarded, and the pellet precipitated once more by the addition of EtOH, CHCl$_3$, and excess hexanes. After centrifugation and removal of the supernantant, the pellet was dried in vacuo, and PBS (500 µL, pH 7.4) was added, followed by filtration through a 0.2 µm filter.

Example 24

Covalent Conjugation of Streptavidin to poly(aminoPEG$_{11}$)$_{25\%}$

Streptavidin (SA) (50 µL, 10 mg/mL) was activated in MES buffer (pH 6.5) using Sulfo-NHS and EDC (20 eq.) for 20 min at RT. The activated SA was mixed with poly(aminoPEG$_{11}$)$_{25\%}$ nanocrystals in sodium bicarbonate buffer at pH 8.4 at a SA:nanocrystal ratio of 5:1 and allowed to react for 1 hr. The samples were dialyzed 2× though a 50 kDa MW cut-off spin concentrator and then used for labeling experiments.

Example 25

Quantum Yield Measurement

QY of 605 nm emitting nanocrystals was measured relative to Rhodamine 640 ($\lambda_{ex}$=535 nm). Solutions of nanocrystals in PBS and dye in ethanol were optically matched at the excitation wavelength. Fluorescence spectra of nanocrystal and dye were taken under identical spectrometer conditions in triplicate and averaged. The optical density was kept below 0.1 between 300-800 nm, and the integrated intensities of the emission spectra, corrected for differences in index of refraction and concentration, were used to calculate the quantum yields using the expression $OY_{nanocrystal}=QY_{Dye} \times (Absorbance_{dye}/Absorbance_{nanocrystal}) \times (Peak\ Area_{nanocrystal}/Peak\ Area_{Dye}) \times (n_{nanocrystal\ solvent})^2/(n_{Dye\ solvent})^2$.[39]

Example 26

Gel Filtration Apparatus

Gel filtration chromatography (GFC) was performed using an ÄKTAprime Plus chromatography system from Amersham Biosciences equipped with a self-packed Superdex 200 10/100 column. PBS (pH 7.4) was used as the mobile phase with a flow rate of 1.0 mL/min. For amine functionalized polymers, the PBS buffer was used. Typical injection volumes were 100 µL. Detection was achieved by measuring the absorption at 280 nm.

Example 27

Cell Culture

HeLa cells were grown in DMEM (Mediatech) with 10% Fetal Bovine Serum (Invitrogen), 50 U/mL penicillin and 50 µg/mL streptomycin (Invitrogen). Transfection plasmids were a kind gift from A. Ting (MIT, US). The cells were transfected using 1 µl Lipofectamine 2000 (Invitrogen), 0.2 µg of BirA-ER and 0.2 µg of AP-YFP-TM per well of an 8-well chamber slide (LabTek). 1 mM biotin was added to the media during plasmid expression. Cells were imaged under 4° C. PBS the day after transfection. 1% Bovine Serum Albumin (Sigma) was added to block non-specific binding during specific binding studies of ligand-coated nanocrystals. Commercial BSA is known to contain biotin, and the stock BSA solution was dialyzed with a 3 kDa cutoff dialysis tube three times for 8 h in PBS pH 7.4, at 4° C.

Example 28

Non-Specific Binding of Nanocrystals to Serum 565 nm emitting CdSe(CdZnS) nanocrystals (5 µL) of various surface coatings were mixed with fetal bovine serum (95 µL) to a final concentration of ~0.5 µM. The mixture was incubated for 4 hr at 37 C with gentle mixing. The resultant nanocrystal size distribution was then measured using gel filtration chromatography. The mixture was injected into a Superose 6 GL10/300 column (GE Healthcare, Piscataway, N.J.) on an Agilent 1100 series HPLC with an in-line degasser, autosampler, diode array detector, and fluorescence detector (Roseville, Calif.). PBS (pH 7.4) was used as the mobile phase with a flow rate of 0.5 mL/min and an injection volume of 50 µL. In order to selectively measure the signal from the nanocrystal rather than FBS, the fluorescence intensity at 565 nm emission and 250 nm excitation was chosen.

Example 29

Fluorescence and Phase Contrast Microscopy

Cells were imaged live using a Nikon TE2000-U inverted microscope with a 60× water-immersion lens and a Princeton Instruments MicroMAX Camera with an additional 1.5× magnification tube lens. Bright field images were collected using differential interference contrast and 10 ms exposure. Fluorescence images were collected with epifluorescent excitation provided by the 488 nm line of an Argon-Ion laser with the appropriate dichroic (Chroma, Z488RDC) and emission filters (D605/30M for 605 nm emitting nanocrystals, D565/30m for YFP). Images were collected and analyzed using ImageJ version 1.41o. Typical exposure times were 0.1-0.5 s and fluorescence images were background-corrected.

Example 30

Animal and Tumor Models

Orthotopic P0008 mammary carcinoma tumor models were obtained by implanting a small piece (1 mm$^3$) of viable tumor tissue for the source animal into the mammary fat pad window chamber of 10-12 weeks old female Tie2-GFP/FVB mice. The tumors were allowed to grow up to 5 mm in diameter. All animal procedures were carried out following the Public Health Service Policy on Humane Care of Laboratory Animals and approved by the Institutional Animal Care and Use Committee of Massachusetts General Hospital.

Example 31

Intravital Multiphoton Imaging

To study tumor vasculature using nanocrystals and their distribution dynamic in live animals, 150 µL poly(PEG) of 600 nm emitting nanocrystals at a concentration of 5 µM were injected retro-orbitally into the tumor bearing mice and imaged with multiphoton laser scanning microscope. The images were recorded as 3D stacks (200 µm thickness, 1 µm step size) at 0 hour, 3 hours and 6 hours time points and processed using the NIH ImageJ software. For the GFP channel, the emission filter used was 535±20 nm, and for the nanocrystals, the emission filter was 625±75 nm. All images were captured with a 20× water emersion lens (N.A. 0.95) and an excitation wavelength of 880 nm (500 mW).

Example 32

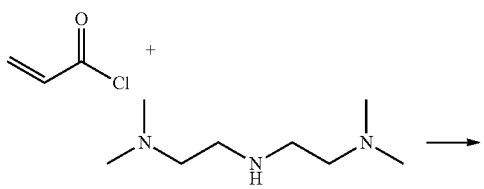

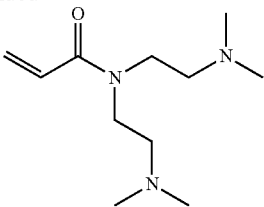

Dendron (3.82 g, 24 mmol) was added to an anhydrous THF (60 mL) at 4° C. To this solution, acryloyl chloride (1.81 g, 20 mmol) was injected slowly which is followed by addition of triehylamine (2.43 g, 24 mmol). The solution was warmed to room temperature and stirred for 2 h. Precipitates were removed by filtration, and the solvent was evaporated in vacuo. Ethylacetate (50 mL) was added to facilitate further precipitation of reaction byproducts, and the solution was filtered once more. The crude product was purified by silica column (ethyl acetate/hexanes gradient 0:100 to 40:60, v/v) to give the pure product as a clear oil.

REFERENCES

1. Dabbousi, B. O.; Rodriguez-Viejo, J.; Mikulec, F. V.; Heine, J. R.; Mattoussi, H.; Ober, R.; Jensen, K. F.; Bawendi, M. G., (CdSe)ZnS Core-Shell Quantum Dots: Synthesis and Characterization of a Size Series of Highly Luminescent Nanocrystallites. *J. Phys. Chem. B* 1997, 101, (46), 9463-9475.
2. Zimmer, J. P.; Kim, S.-W.; Ohnishi, S.; Tanaka, E.; Frangioni, J. V.; Bawendi, M. G., Size Series of Small Indium Arsenide-Zinc Selenide Core-Shell Nanocrystals and Their Application to In Vivo Imaging. *J. Am. Chem. Soc.* 2006, 128, (8), 2526-2527.
3. Bruchez, M., Jr.; Moronne, M.; Gin, P.; Weiss, S.; Alivisatos, A. P., Semiconductor Nanocrystals as Fluorescent Biological Labels. *Science* 1998, 281, (5385), 2013-2016.
4. Peng, Z. A.; Peng, X., Formation of High-Quality CdTe, CdSe, and CdS Nanocrystals Using CdO as Precursor. *J. Am. Chem. Soc.* 2001, 123, (1), 183-184.
5. Michalet, X.; Pinaud, F. F.; Bentolila, L. A.; Tsay, J. M.; Doose, S.; Li, J. J.; Sundaresan, G.; Wu, A. M.; Gambhir, S. S.; Weiss, S., Quantum Dots for Live Cells, in Vivo Imaging, and Diagnostics. *Science* 2005, 307, (5709), 538-544.
6. Ballou, B.; Lagerholm, B. C.; Ernst, L. A.; Bruchez, M. P.; Waggoner, A. S., Noninvasive Imaging of Quantum Dots in Mice. *Bioconjug. Chem.* 2004, 15, (1), 79-86.
7. Dahan, M.; Levi, S.; Luccardini, C.; Rostaing, P.; Riveau, B.; Triller, A., Diffusion Dynamics of Glycine Receptors Revealed by Single-Quantum Dot Tracking. *Science* 2003, 302, (5644), 442-445.
8. Michaluk, P.; Mikasova, L.; Groc, L.; Frischknecht, R.; Choquet, D.; Kaczmarek, L., Matrix Metalloproteinase-9 Controls NMDA Receptor Surface Diffusion through Integrin beta 1 Signaling. *Journal of Neuroscience* 2009, 29, (18), 6007-6012.
9. Iyer, G.; Michalet, X.; Chang, Y. P.; Pinaud, F. F.; Matyas, S. E.; Payne, G.; Weiss, S., High Affinity scFv-Hapten Pair as a Tool for Quantum Dot Labeling and Tracking of Single Proteins in Live Cells. *Nano Letters* 2008, 8, (12), 4618-4623.
10. Wu, X.; Liu, H.; Liu, J.; Haley, K. N.; Treadway, J. A.; Larson, J. P.; Ge, N.; Peale, F.; Bruchez, M. P., Immunofluorescent labeling of cancer marker Her2 and other cellular targets with semiconductor quantum dots. *Nature Biotechnol.* 2003, 21, (1), 41-46.
11. Smith, A. M.; Duan, H.; Rhyner, M. N.; Ruan, G.; Nie, S., A systematic examination of surface coatings on the optical and chemical properties of semiconductor quantum dots. *Phys. Chem. Chem. Phys.* 2006, 8, 3895-3903.
12. Howarth, M.; Chinnapen, D. J. F.; Gerrow, K.; Dorrestein, P. C.; Grandy, M. R.; Kelleher, N. L.; El-Husseini, A.; Ting, A. Y., A monovalent streptavidin with a single femtomolar biotin binding site. *Nat Meth* 2006, 3, (4), 267-273.
13. Howarth, M.; Takao, K.; Hayashi, Y.; Ting, A. Y., Targeting quantum dots to surface proteins in living cells with biotin ligase. *Proc Natl Acad Sci USA.* 2005, 102, (21), 7583-7588.
14. Groc, L.; Heine, M.; Cognet, L.; Brickley, K.; Stephenson, F. A.; Lounis, B.; Choquet, D., Differential activity-dependent regulation of the lateral mobilities of AMPA and NMDA receptors. *Nat. Neurosci.* 2004, 7, (7), 695-696.
15. Aldana, J.; Wang, Y. A.; Peng, X., Photochemical Instability of CdSe Nanocrystals Coated by Hydrophilic Thiols. *J. Am. Chem. Soc.* 2001, 123, (36), 8844-8850.
16. Algar, W. R.; Krull, U. J., Adsorption and Hybridization of Oligonucleotides on Mercaptoacetic Acid-Capped CdSe/ZnS Quantum Dots and Quantum Dot-Oligonucleotide Conjugates. *Langmuir* 2006, 22, (26), 11346-11352.
17. Mattoussi, H.; Mauro, J. M.; Goldman, E. R.; Anderson, G. P.; Sundar, V. C.; Mikulec, F. V.; Bawendi, M. G., Self-Assembly of CdSe—ZnS Quantum Dot Bioconjugates Using an Engineered Recombinant Protein. *J. Am. Chem. Soc.* 2000, 122, (49), 12142-12150.
18. Susumu, K.; Uyeda, H. T.; Medintz, I. L.; Pons, T.; Delehanty, J. B.; Mattoussi, H., Enhancing the stability and biological functionalities of quantum dots via compact multifunctional ligands. *Journal of the American Chemical Society* 2007, 129, (45), 13987-13996.
19. Liu, W.; Howarth, M.; Greytak, A. B.; Zheng, Y.; Nocera, D. G.; Ting, A. Y.; Bawendi, M. G., Compact Biocompatible Quantum Dots Functionalized for Cellular Imaging. *J. Am. Chem. Soc.* 2008, 130, (4), 1274-1284.
20. Uyeda, H. T.; Medintz, I. L.; Jaiswal, J. K.; Simon, S. M.; Mattoussi, H., Synthesis of Compact Multidentate Ligands to Prepare Stable Hydrophilic Quantum Dot Fluorophores. *J. Am. Chem. Soc.* 2005, 127, (11), 3870-3878.
21. Howarth, M.; Liu, W.; Puthenveetil, S.; Zheng, Y.; Marshall, L. F.; Schmidt, M. M.; Wittrup, K. D.; Bawendi, M. G.; Ting, A. Y., Monovalent, reduced-size quantum dots for imaging receptors on living cells. *Nat Meth* 2008, 5, (5), 397-399.
22. Sapsford, K. E.; Pons, T.; Medintz, I. L.; Higashiya, S.; Brunel, F. M.; Dawson, P. E.; Mattoussi, H., Kinetics of Metal-Affinity Driven Self-Assembly between Proteins or Peptides and CdSe—ZnS Quantum Dots. *J. Phys. Chem. C.* 2007, 111, (11528-11538).
23. Medintz, I. L.; Pons, T.; Delehanty, J. B.; Susumu, K.; Brunel, F. M.; Dawson, P. E.; Mattoussi, H., Intracellular delivery of quantum dot-protein cargos mediated by cell penetrating peptides. *Bioconjugate Chemistry* 2008, 19, (9), 1785-1795.
24. Aaron R. Clapp, I. L. M., Hedi Mattoussi, Förster Resonance Energy Transfer Investigations Using Quantum-Dot Fluorophores. *ChemPhysChem* 2006, 7, (1), 47-57.
25. Yildiz, I.; McCaughan, B.; Cruickshank, S. F.; Callan, J. F.; Raymo, F. i. M., Biocompatible CdSe—ZnS Core-Shell Quantum Dots Coated with Hydrophilic Polythiols. *Langmuir* 2009, 25, (12), 7090-7096.
26. Bentzen, E. L.; Tomlinson, I. D.; Mason, J.; Gresch, P.; Warnement, M. R.; Wright, D.; Sanders-Bush, E.; Blakely, R.; Rosenthal, S. J., Surface modification to reduce nonspecific binding of quantum dots in live cell assays. *Bioconjugate Chemistry* 2005, 16, (6), 1488-1494.
27. Chiefari, J.; Chong, Y. K.; Ercole, F.; Krstina, J.; Jeffery, J.; Le, T. P. T.; Mayadunne, R. T. A.; Meijs, G. F.; Moad, C. L.; Moad, G.; Rizzardo, E.; Thang, S. H., Living free-radical polymerization by reversible addition-fragmentation chain transfer: The RAFT process. *Macromolecules* 1998, 31, (16), 5559-5562.
28. Naoto, A.; Bungo, O.; Hideharu, M.; Takeshi, E., Mild and Efficient One-Step Synthesis of Trithiocarbonates Using Minimum Amount of $CS_2$. *ChemInform* 2006, 37, (27).
29. Li, J. J.; Wang, Y. A.; Guo, W. Z.; Keay, J. C.; Mishima, T. D.; Johnson, M. B.; Peng, X. G., Large-scale synthesis of nearly monodisperse CdSe/CdS core/shell nanocrystals using air-stable reagents via successive ion layer adsorption and reaction. *Journal of the American Chemical Society* 2003, 125, (41), 12567-12575.
30. Xie, R.; Kolb, U.; Li, J.; Basche, T.; Mews, A., Synthesis and Characterization of Highly Luminescent CdSe-Core CdS/Zn0.5Cd0.5S/ZnS Multishell Nanocrystals. *J. Am. Chem. Soc.* 2005, 127, (20), 7480-7488.
31. Ueda, E. K. M.; Gout, P. W.; Morganti, L., Current and prospective applications of metal ion-protein binding. *Journal of Chromatography A* 2003, 988, (1), 1-23.
32. Medintz, I. L.; Clapp, A. R.; Mattoussi, H.; Goldman, E. R.; Fisher, B.; Mauro, J. M., Self-assembled nanoscale biosensors based on quantum dot FRET donors. *Nat. Mater.* 2003, 2, (9), 630-638.
33. Snee, P. T.; Somers, R. C.; Nair, G.; Zimmer, J. P.; Bawendi, M. G.; Nocera, D. G., A Ratiometric CdSe/ZnS Nanocrystal pH Sensor. *J. Am. Chem. Soc.* 2006, 128, (41), 13320-13321.
34. Somers, R. C.; Bawendi, M. G.; Nocera, D. G., CdSe nanocrystal based chem-/bio-sensors. *Chem. Soc. Rev.* 2007, 36, 579-591.
35. Mei, B. C.; Susumu, K.; Medintz, I. L.; Delehanty, J. B.; Mountziaris, T. J.; Mattoussi, H., Modular poly(ethylene glycol) ligands for biocompatible semiconductor and gold nanocrystals with extended pH and ionic stability. *Journal of Materials Chemistry* 2008, 18, (41), 4949-4958.
36. Motoike, T.; Loughna, S.; Perens, E.; Roman, B.; Liao, W.; Chau, T.; Richardson, C.; Kawate, T.; Kuno, J.; Weinstein, B.; Stainier, D.; Sato, T., Universal GFP Reporter for the Study of Vascular Development. *Genesis* 2000, 28, 75-81.
37. Murray, C. B.; Norris, D. J.; Bawendi, M. G., Synthesis and characterization of nearly monodisperse CdE (E=sulfur, selenium, tellurium) semiconductor nanocrystallites. *J. Am. Chem. Soc.* 1993, 115, (19), 8706-8715.
38. Snee, P. T.; Chan, Y.; Nocera, D. G.; Bawendi, M. G., Whispering-Gallery-Mode Lasing from a Semiconductor Nanocrystal/Microsphere Resonator Composite. *Adv. Mater.* 2005, 17, (9), 1131-1136.
39. Eaton, D., Reference Materials for Fluorescence Measurement. *Pure Appl. Chem.* 1988, 60, (7), 1107-1114.

Each of the above references is incorporated by reference in its entirety.

Other embodiments are within the scope of the following claims.

What is claimed is:
1. A nanomaterial comprising:
   a nanocrystal; and
   an outer layer including a ligand, wherein the ligand includes a polymer including a random copolymer including regions of $R^1$, $R^2$, and $R^3$, wherein:
   $R^1$ has a formula $-L^1-T^1$, wherein $L^1$ includes alkylene terminated by —CONH—, wherein $T^1$ includes imidazole;
   $R^2$ has a formula $-L^2-T^2$, wherein $L^2$ includes alkylene terminated by —CONH—, wherein $T^2$ includes —[O—$CH_2$—$CHR^5$]$_n$—$R^6$, where $R^5$ is H, n is an integer in the range of 0 to 30, and $R^6$ is $C_1$ to $C_6$ alkoxy;
   $R^3$ has a formula $-L^3-T^3$, wherein $L^3$ includes alkylene terminated by —CONH—, wherein $T^3$ includes —[O—$CH_2$—$CHR^7$]$_m$—$R^8$, where $R^7$ is H, m is an integer in the range of 0 to 30, and $R^8$ is $C_1$ to $C_6$ aminoalkyl.

2. A method of making a ligand, comprising:
   mixing a first monomer or oligomer including $R^1$; a second monomer or oligomer including $R^2$; and a third monomer or oligomer including $R^3$; wherein:
   $R^1$ has a formula $-L^1-T^1$, wherein $L^1$ includes alkylene terminated by —CONH—, wherein $T^1$ includes imidazole;
   $R^2$ has a formula $-L^2-T^2$ wherein $L^2$ includes alkylene terminated by —CONH—, wherein $T^2$ includes —[O—$CH_2$—$CHR^5$]$_n$—$R^6$, where $R^5$ is H, n is an integer in the range of 0 to 30, and $R^6$ is $C_1$ to $C_6$ alkoxy;
   $R^3$ has the formula $-L^3-T^3$, wherein $L^3$ includes alkylene terminated by —CONH—, wherein $T^3$ includes —[O—$CH_2$—$CHR^7$]$_m$—$R^8$, where $R^7$ is H, in is an integer in the range of 0 to 30, and $R^8$ is $C_1$ to $C_5$ aminoalkyl; and
   forming a ligand from the first monomer oligomer, the second monomer or oligomer, and the third monomer oligomer.

3. A ligand including a polymer including a random copolymer including regions having each of the following formulae:

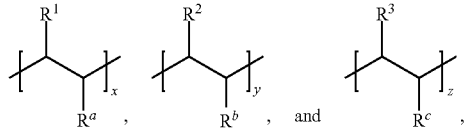

wherein
$R^1$ has a formula $-L^1-T^1$, wherein $L^1$ includes alkylene terminated by —CONH—, wherein $T^1$ includes imidazole:
$R^2$ has the formula $-L^2-T^2$, wherein for $L^2$ includes alkylene terminated by —CONH—, wherein $T^2$ includes —[O—$CH_2$—$CHR^5$]$_n$—$R^6$, where $R^5$ is H, n is an integer in the range of 0 to 30, and $R^6$ is $C_1$ to $C_6$ alkoxy;
$R^3$ has the formula $-L^3-T^3$, wherein $L^3$ includes alkylene terminated by —CONH—, wherein $T^3$ includes —[O—$CH_2$—$CHR^7$]$_m$—$R^8$, where $R^7$ is H, m is an integer in the range of 0 to 30, and $R^8$ is $C_1$ to $C_6$ aminoalkyl;
each of $R^a$, $R^b$, and $R^c$, independently, is substituted or unsubstituted alkyl, substituted or unsubstituted alkoxy, substituted or unsubstituted aryl, or substituted or unsubstituted aryloxy; and
each of x, y, and z, independently, a positive integer.

4. A method of making a nonmaterial, comprising: contacting the ligand of claim 3 with a nanocrystal.

5. The nanomaterial of claim 1, wherein $L^1$, $L^2$, and $L^3$ are each independently —C(O)NH—$(CH_2)_i$— wherein i is an integer in the range of 0 to 6.

6. The nanomaterial of claim 1, wherein n is an integer in the range of 5 to 25 and $R^6$ is H, methyl, or ethyl.

7. The nanomaterial of claim 1, wherein m is an integer in the range of 0 to 10.

8. The nanomaterial of claim 1, wherein the nanocrystal is a semiconductor nanocrystal.

9. An aqueous nanomaterial suspension comprising the nanomaterial of claim 1, wherein the aqueous nanomaterial suspension remains stable as an aqueous suspension when stored under ambient conditions for at least 2 months.

* * * * *